May 16, 1933.   D. L. SUMMEY   1,909,596
SAMPLING APPARATUS
Filed Dec. 18, 1929   14 Sheets-Sheet 1
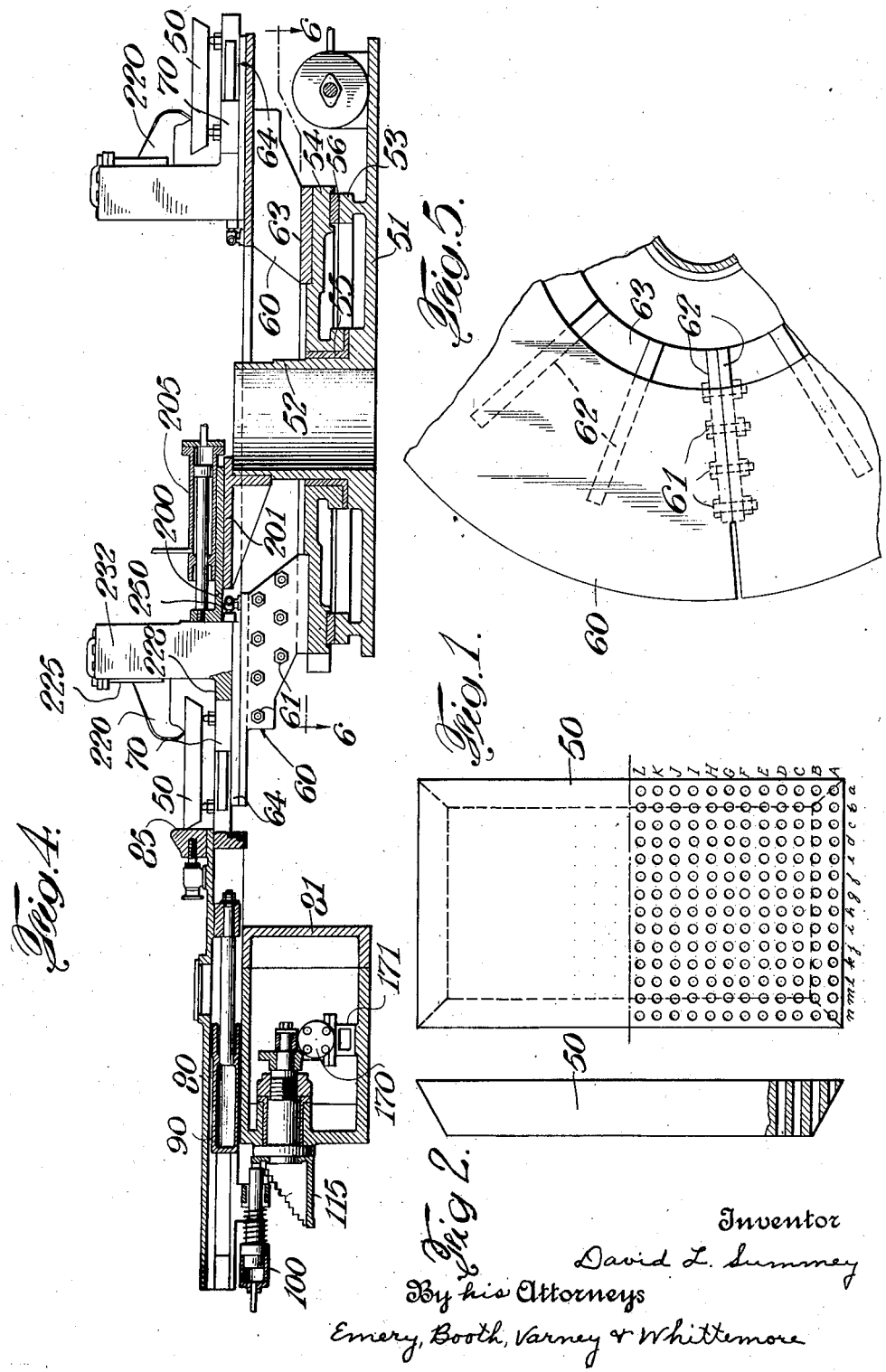
Inventor
David L. Summey
By his Attorneys
Emery, Booth, Varney & Whittemore May 16, 1933.  D. L. SUMMEY  1,909,596
SAMPLING APPARATUS
Filed Dec. 18, 1929   14 Sheets-Sheet 2

Inventor
David L. Summey
By his Attorneys
Emery, Booth, Varney & Whittemore

May 16, 1933.  D. L. SUMMEY  1,909,596
SAMPLING APPARATUS
Filed Dec. 18, 1929  14 Sheets-Sheet 3

Inventor
David L. Summey
By his Attorneys
Emery, Booth, Varney & Whittemore

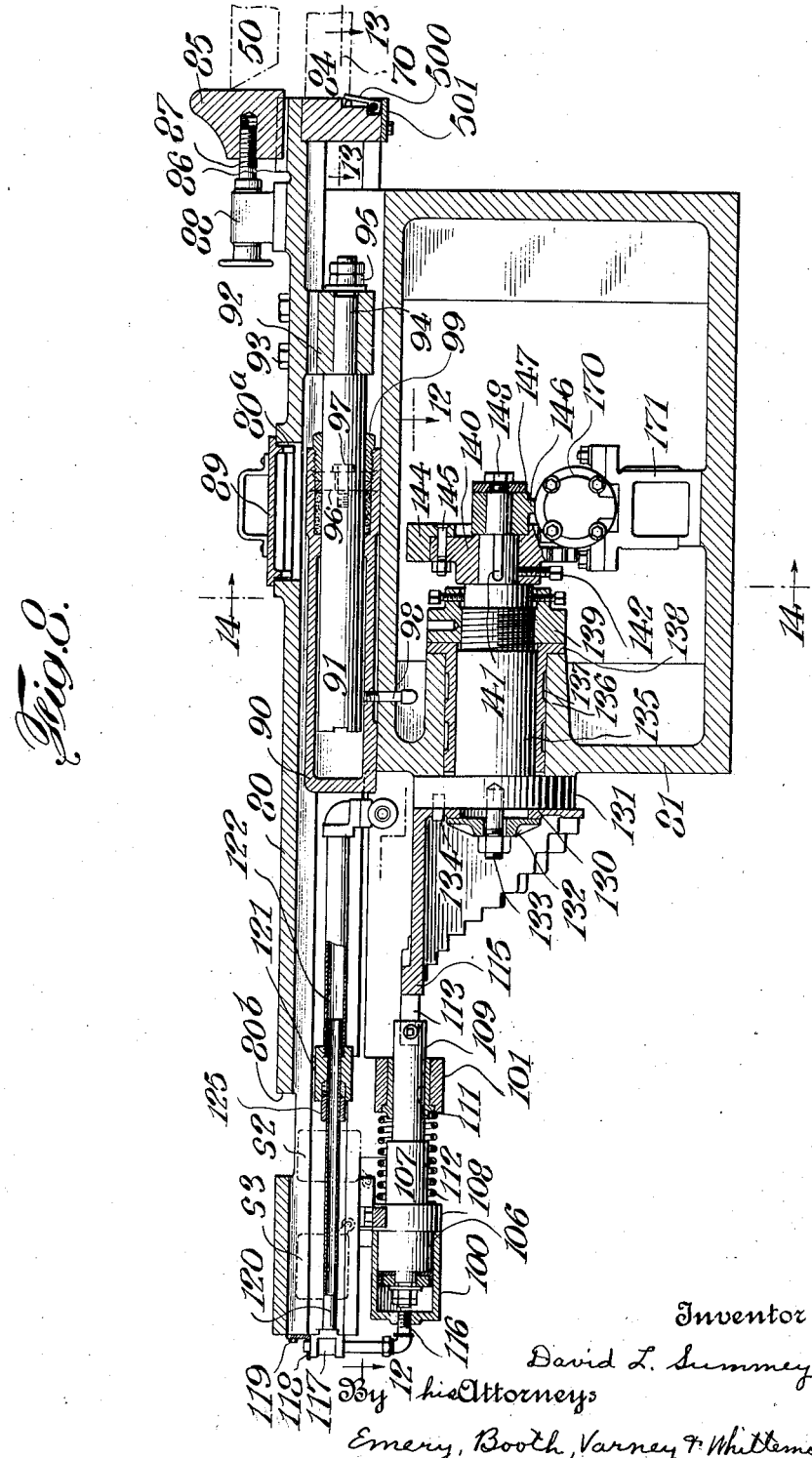

May 16, 1933.  D. L. SUMMEY  1,909,596
SAMPLING APPARATUS
Filed Dec. 18, 1929    14 Sheets-Sheet 5
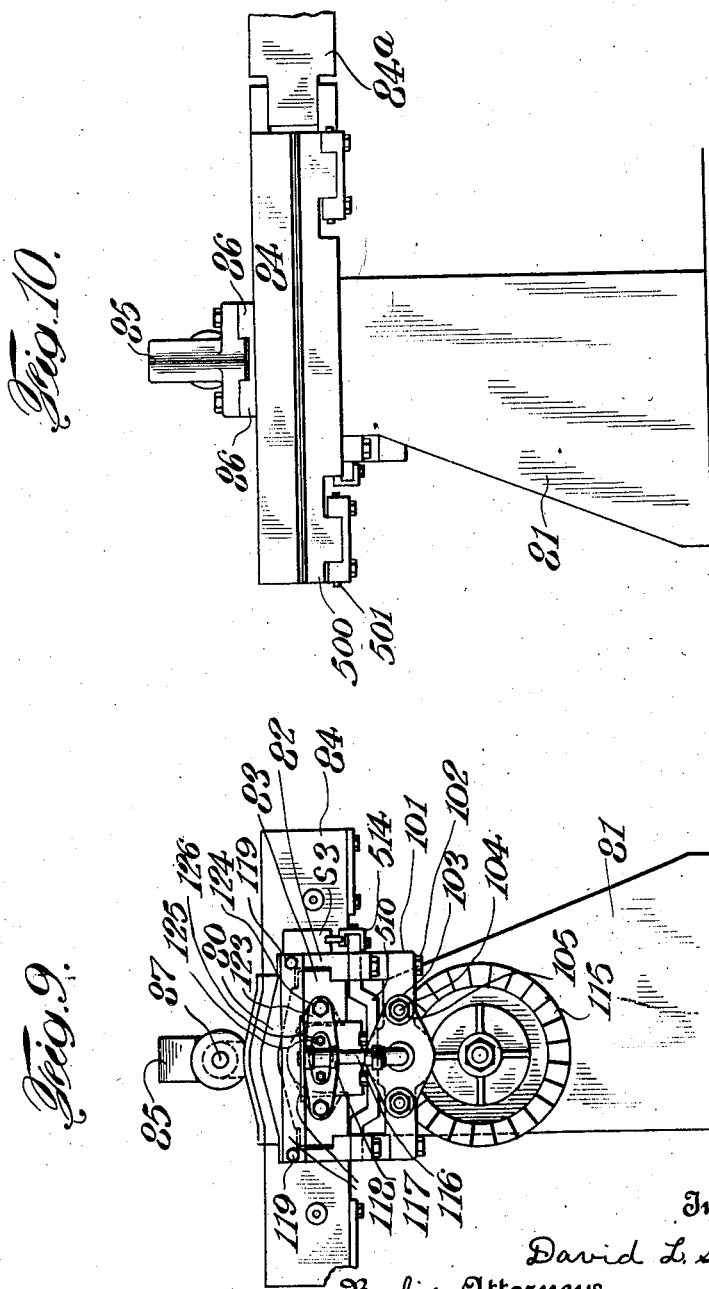

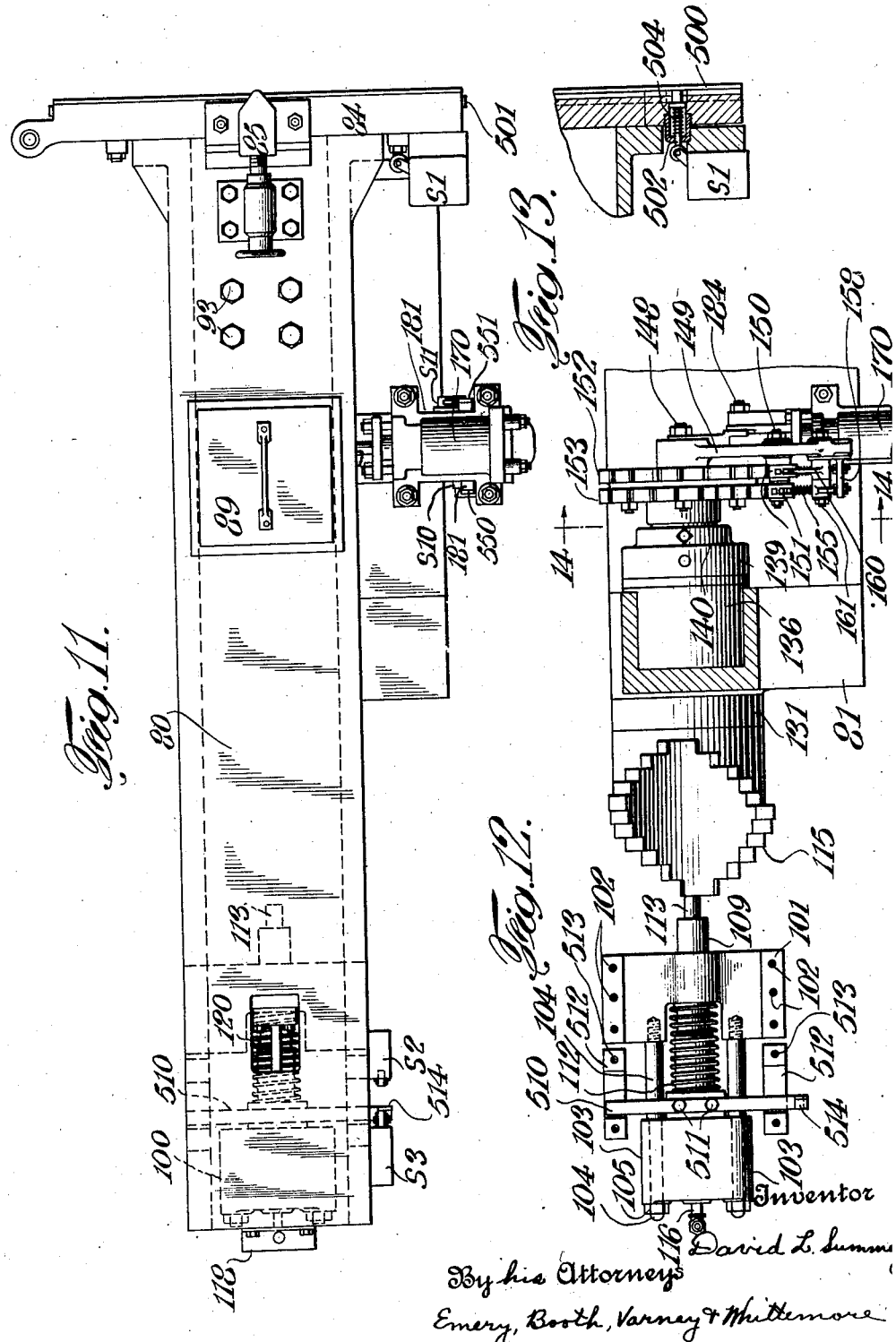

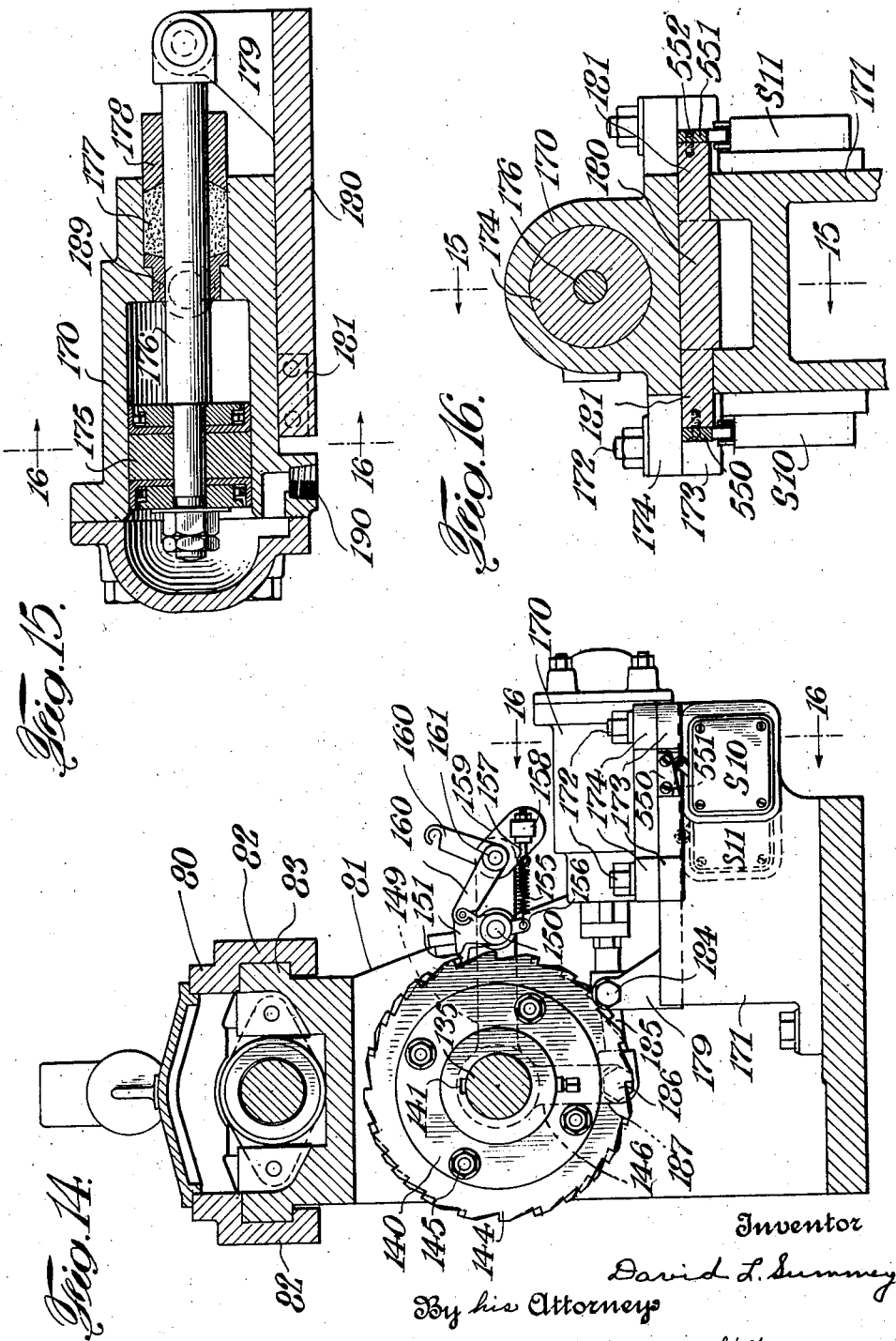

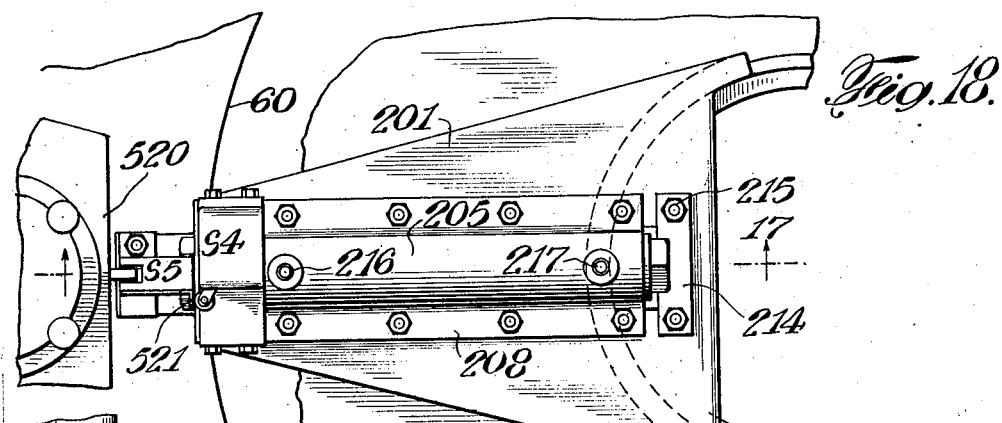
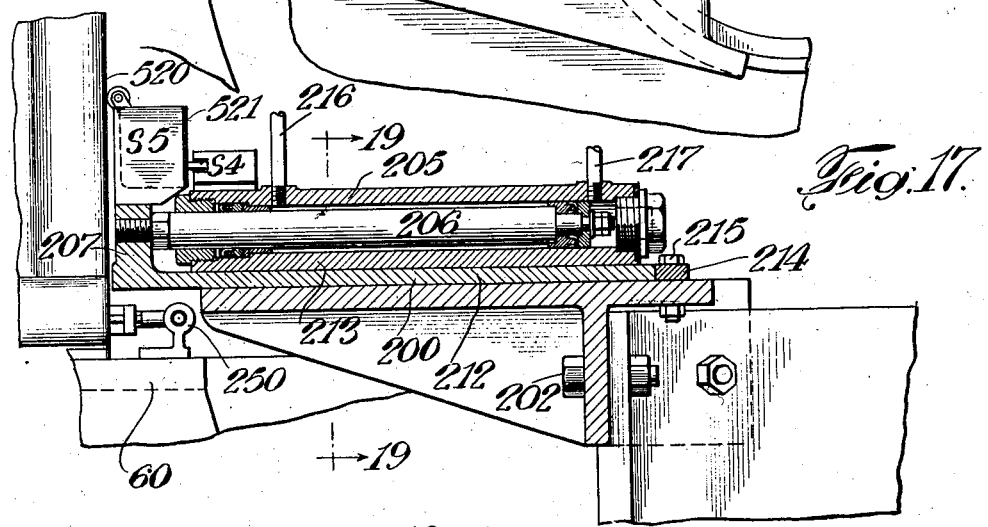
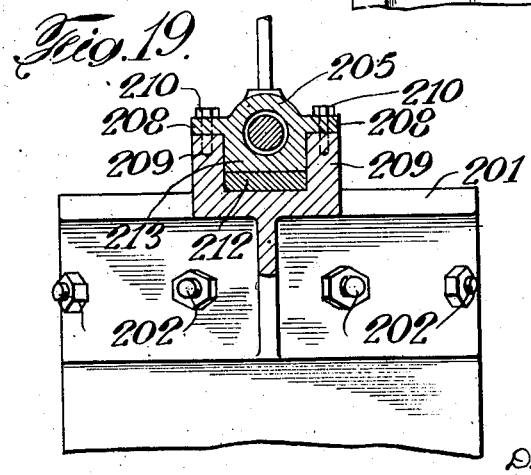

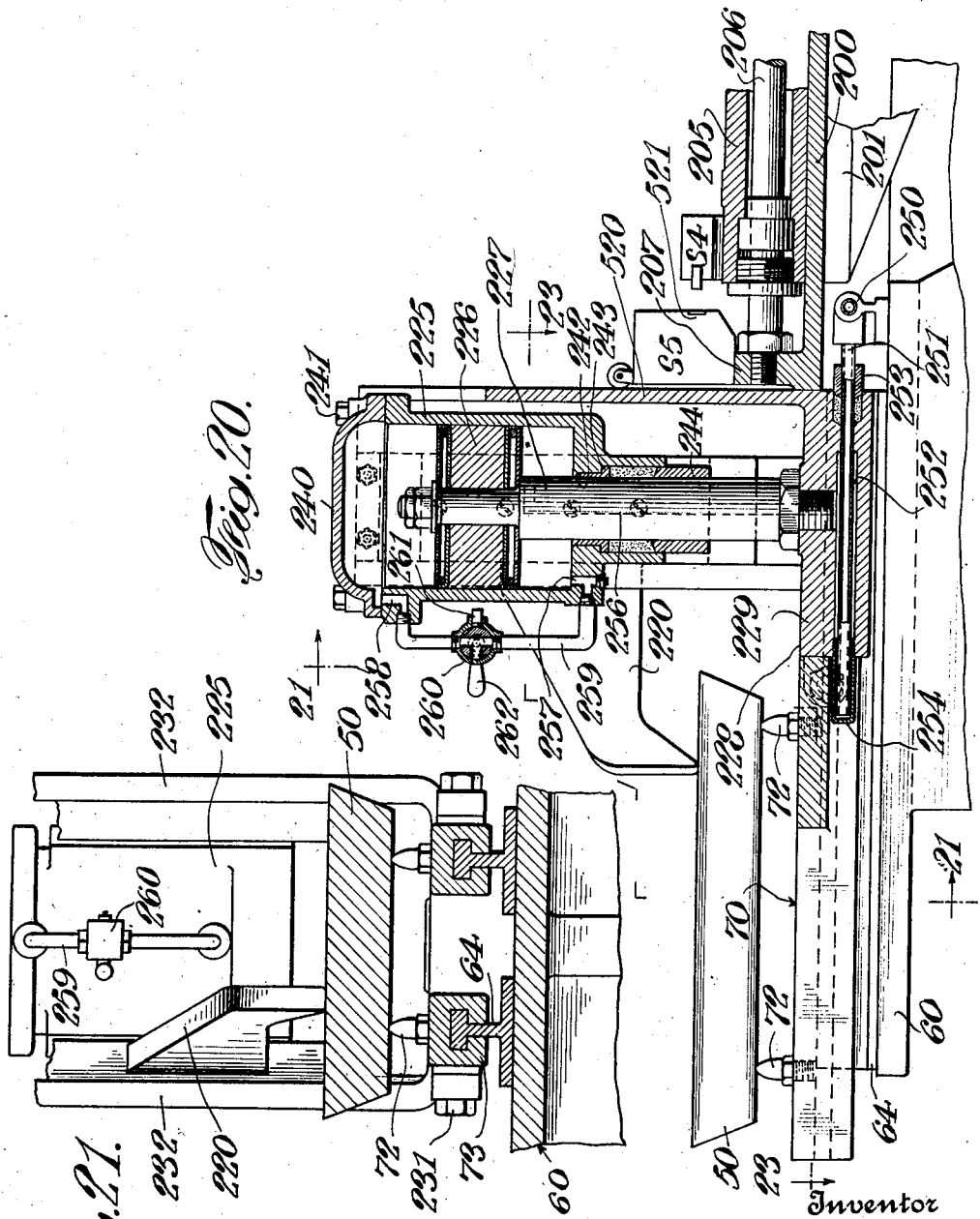

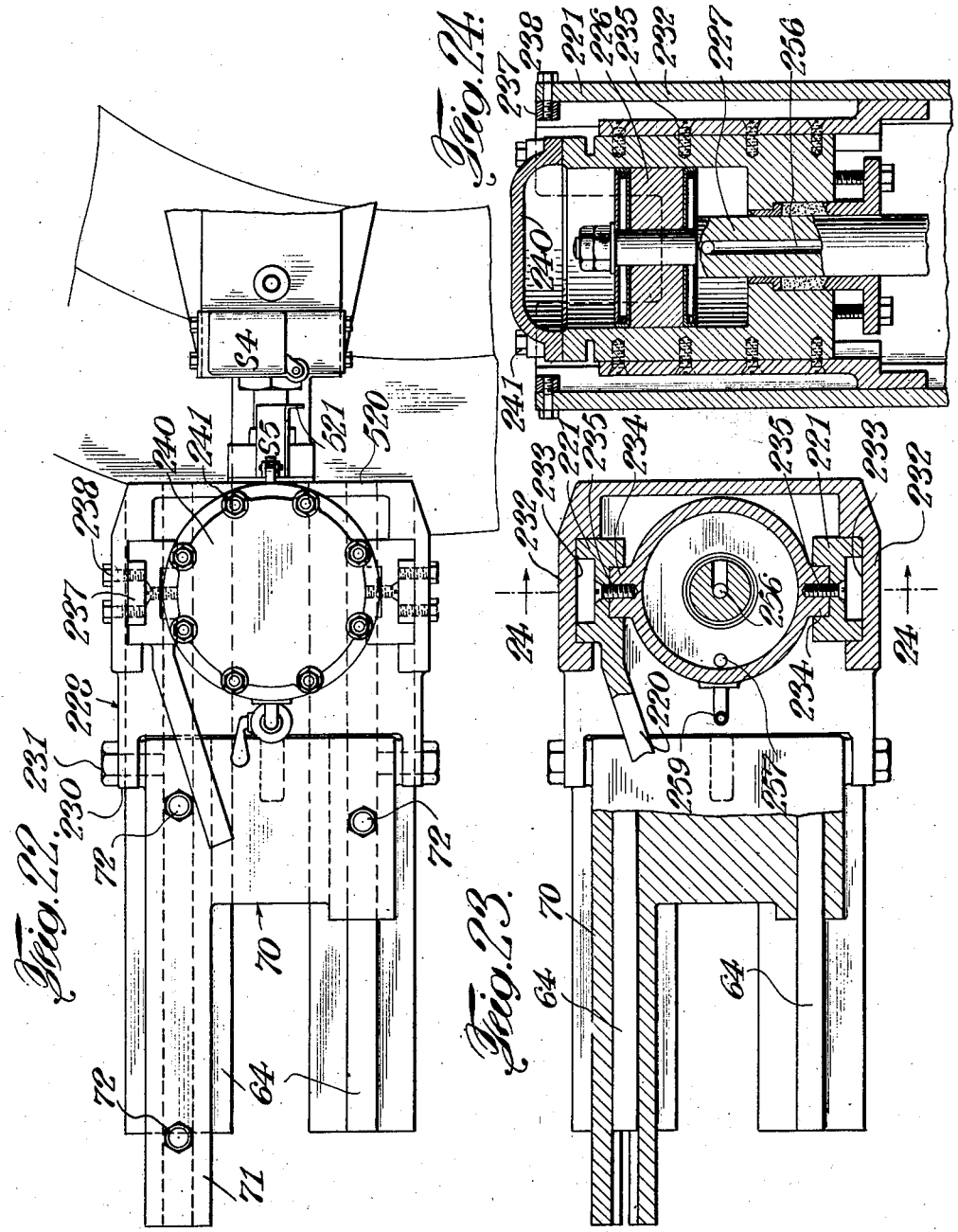

May 16, 1933.    D. L. SUMMEY    1,909,596
SAMPLING APPARATUS
Filed Dec. 18, 1929    14 Sheets-Sheet 11

Inventor
David L. Summey
By his Attorneys
Emery, Booth, Varney & Whittemore

May 16, 1933.   D. L. SUMMEY   1,909,596
SAMPLING APPARATUS
Filed Dec. 18, 1929   14 Sheets-Sheet 12
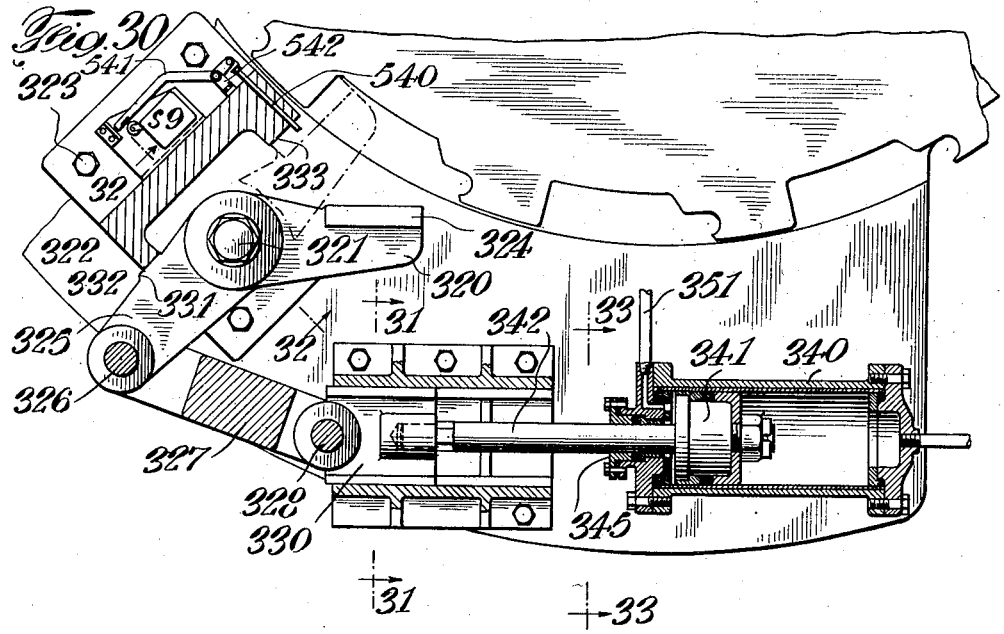
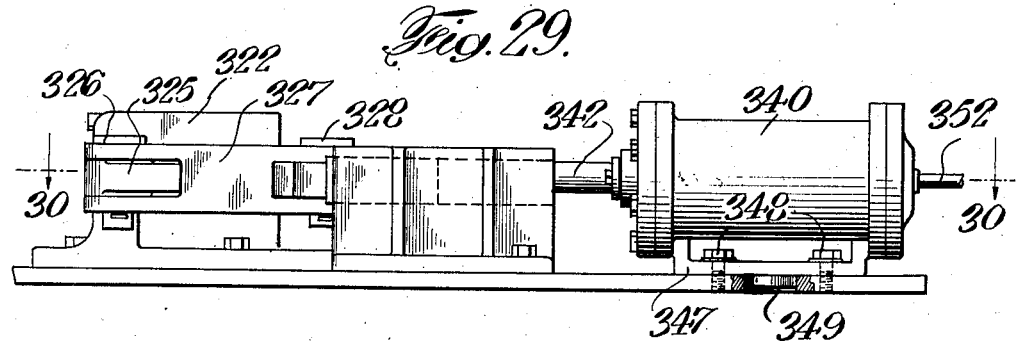
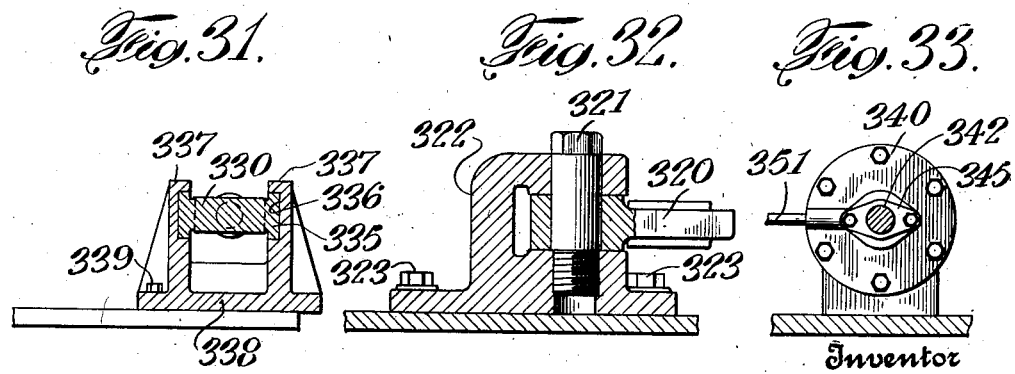
Inventor
David L. Summey
By his Attorneys
Emery, Booth, Varney & Whittemore

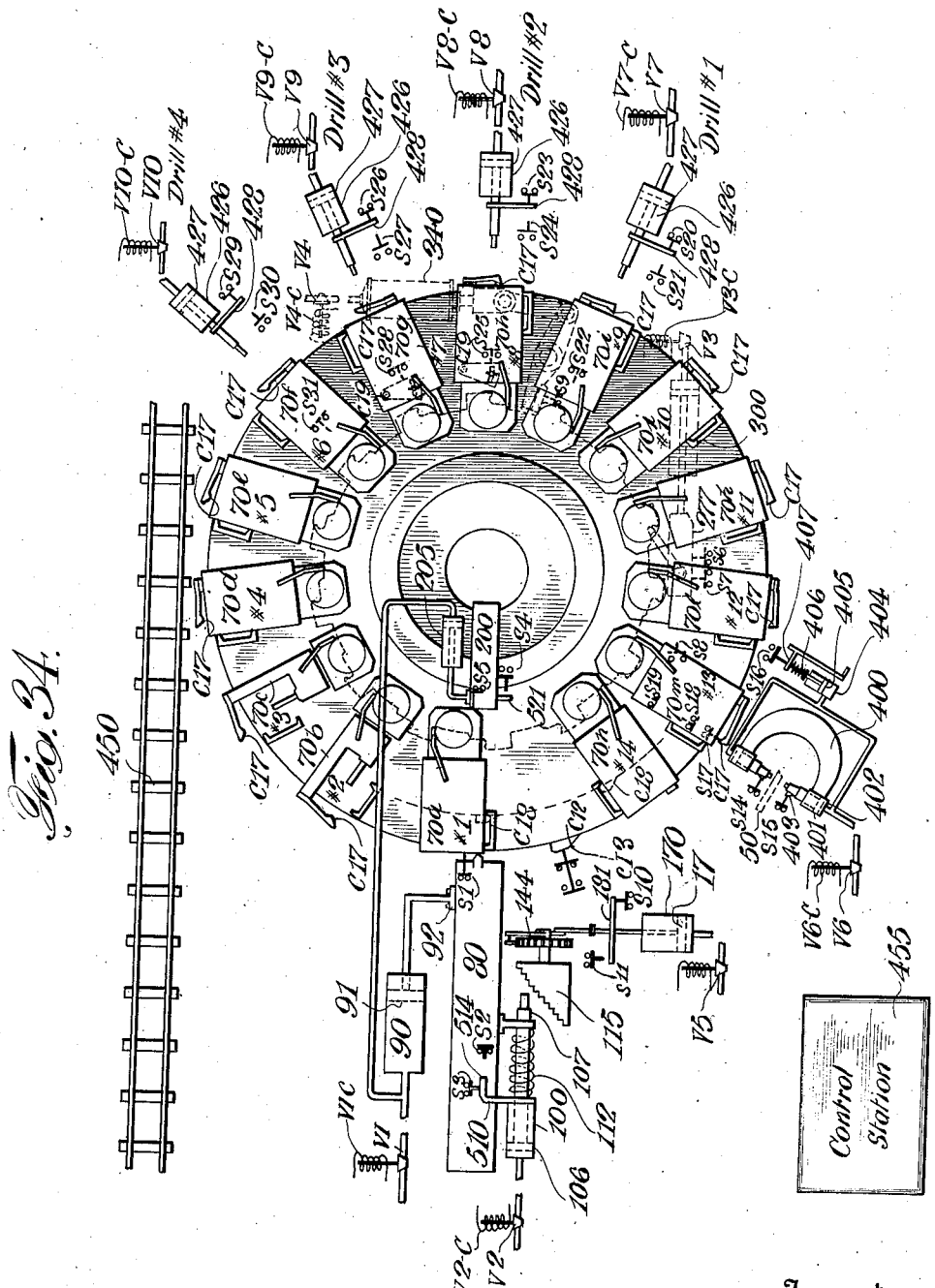

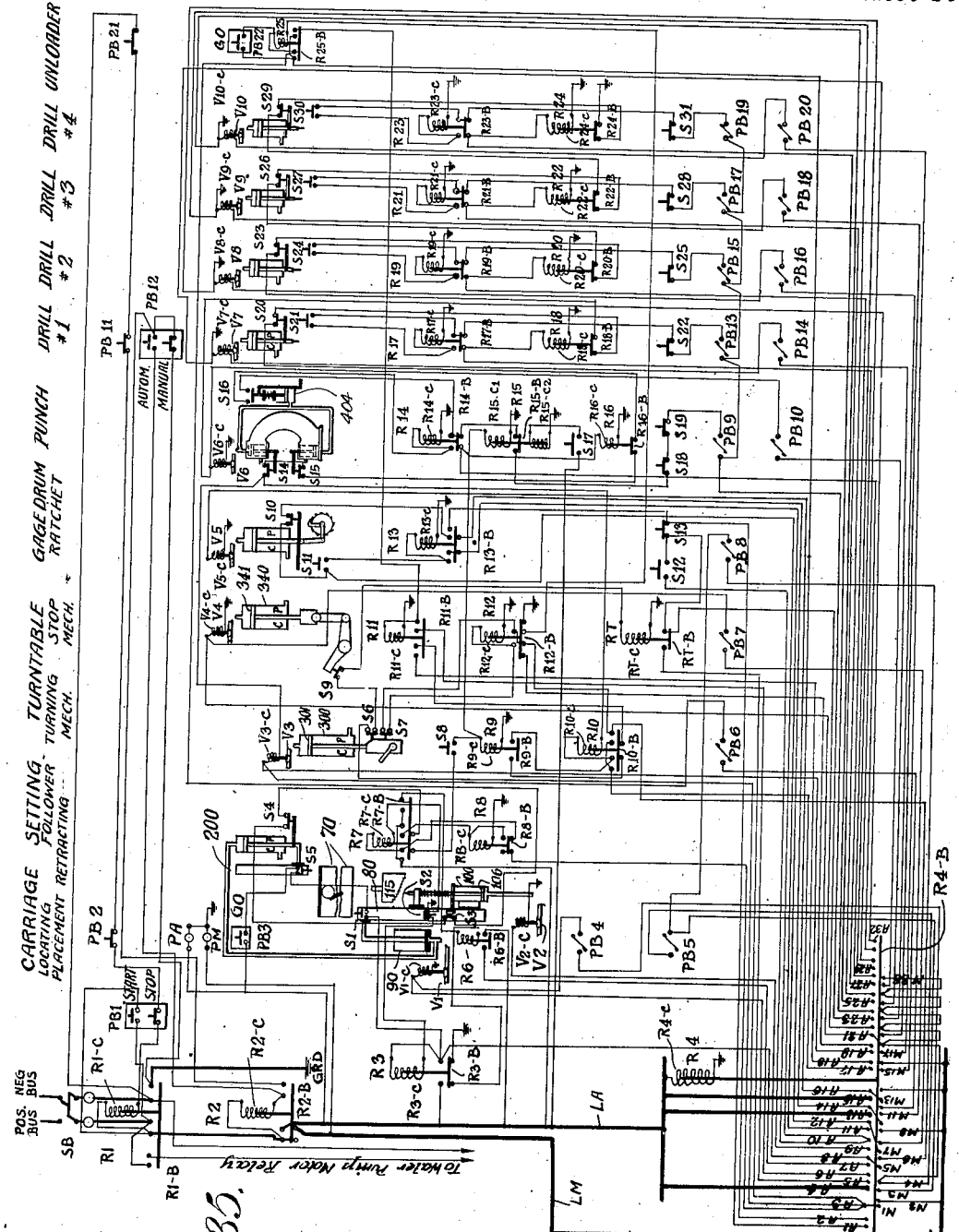

Patented May 16, 1933

1,909,596

UNITED STATES PATENT OFFICE

DAVID L. SUMMEY, OF WATERBURY, CONNECTICUT, ASSIGNOR TO UNITED STATES METALS REFINING COMPANY, OF CARTERET, NEW JERSEY, A CORPORATION OF NEW JERSEY

SAMPLING APPARATUS

Application filed December 18, 1929. Serial No. 414,865.

This invention relates to sampling apparatus and for the purpose of furnishing a practical understanding of the invention it will be described and discussed in connection with the problem of sampling flat ingots or slabs of blister copper. One of the objects of the invention is the provision of an efficient machine for taking samples. Other objects will be apparent from the following description.

Unrefined or what is usually designated as blister copper contains numerous impurities, some of which are less valuable than the copper, but others of which are more valuable than the copper. Often there is a considerable content of gold and silver. This being true, it has become customary in commercial transactions to take these factors into consideration and appraise a lot or consignment of such ingots according to an analysis of their content.

In order to obtain a reliable analysis, samples are taken from each ingot, thoroughly mixed with samples from other ingots of the lot, and a test sample taken from the mixed samples. The ingots, however, may vary in quality throughout their mass so it is usual to take samples from different parts of the ingots in a predetermined order according to a chart or templet, one ingot being sampled at one point, the next at another point and continuing thus until one ingot has been sampled for each point in the chart, after which the procedure is repeated as often as necessary to obtain a sample from every ingot of the lot.

Practicaly all copper smelted at the present time is cast into ingots of slab form, the slabs being beveled on their edges. These slabs are often pitted or irregular due to faulty molds or other causes and often also contain numerous gas pockets. This increases the desirability of obtaining samples at various places in the slab.

The present invention provides apparatus for obtaining the required samples in an accurate and rapid manner and to a large extent by automatic machinery. The apparatus chosen for specific illustration is adapted to handle slab-shaped ingots particularly discussed above but the broad principles of the invention are in certain aspects entirely applicable to sampling ingots or other bodies of different shape.

In describing the exemplary embodiment of the invention reference is made to the accompanying drawings thereof wherein:

Figure 1 is a plan view of a slab showing the location of holes according to one standard chart or templet;

Figure 2 is an edge view of the same partly in section showing the slab as it would appear if drilled in several places;

Figure 4 is a central vertical section taken approximately on the line 4—4 of Figure 3;

Figure 5 is a fragmentary plan view of a turntable shown in Figure 4, parts supported by the table being removed;

Figure 7 is a side elevation taken on the lower side of Figure 6, the view, however, showing some parts of the turntable located above the section line on which Figure 6 is taken;

Figure 8 is an enlarged section corresponding to the left portion of Figure 4 showing certain locating mechanism for billet-carriages on the turntable, the parts being shown in a different position from that of Figure 4;

Figure 9 is an end elevation taken at the left of Figure 8;

Figure 10 is an end elevation taken at the right of Figure 8;

Figure 11 is a plan view looking at the top of Figure 8;

Figure 12 is a horizontal section taken on the line 12—12 of Figure 8 showing certain gaging mechanism;

Figure 13 is a fragmentary section taken on the line 13—13 of Figure 8;

Figure 14 is an enlarged vertical section taken on the line 14—14 of Figs. 8 and 12;

Figure 15 is a vertical section taken on the line 15—15 of Figure 16;

Figure 16 is a vertical section taken on the line 16—16 of Figures 14 and 15;

Figure 17 is an enlarged vertical section corresponding to an intermediate portion of Figure 4, the view also being a section on the line 17—17 of Figure 18, showing certain follower mechanism for billet-carriages on the turntable;

Figure 18 is a plan view looking at the top of Figure 17;

Figure 19 is a vertical section taken on the line 19—19 of Figure 17;

Figure 20 is an enlarged vertical section corresponding to an intermediate portion of Figure 4, showing certain clamping mechanism for billets on the table;

Figure 21 is a section taken on the line 21—21 of Figure 20;

Figure 22 is a plan view looking at the top of Figure 20;

Figure 23 is a horizontal section taken on the line 23—23 of Figure 20;

Figure 24 is a vertical section taken on the line 24—24 of Figure 23;

Figure 29 is an enlarged elevation taken at the right of Figure 6, showing the turntable stopping mechanism alone;

Figure 30 is a section taken on the line 30—30 of Figure 29;

Figure 31 is a section taken on the line 31—31 of Figure 30;

Figure 32 is a section taken on the line 32—32 of Figure 30;

Figure 33 is a section taken on the line 33—33 of Figure 30;

Figure 34 is a schematic view illustrating the general arrangement of operating mechanism and switches;

Figure 35 is a wiring diagram with operating mechanism shown schematically.

*Chart or templet for rectangular slabs*

Figure 3:
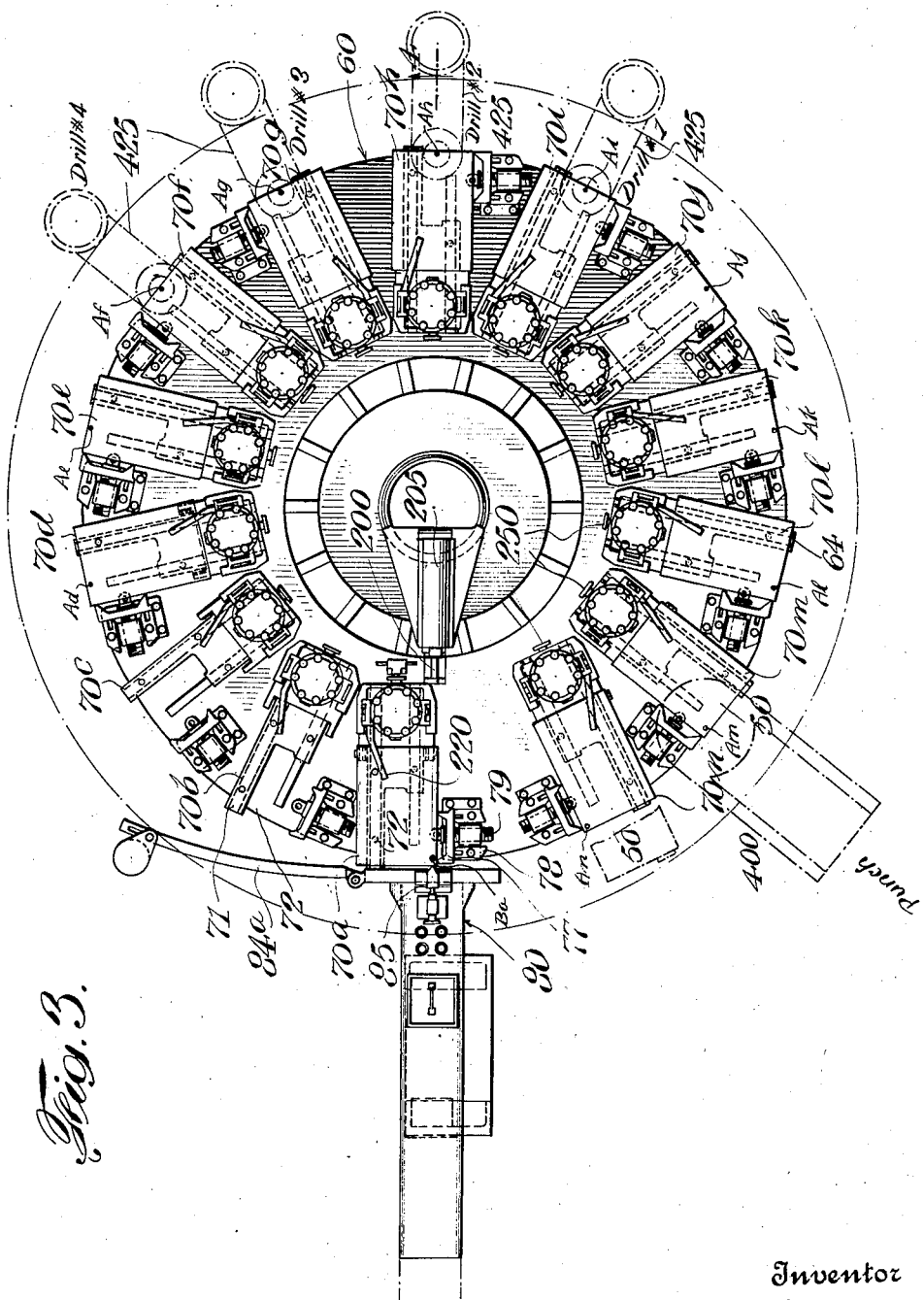
Figure 3 is an assembly plan view of the apparatus.

Since rectangular slabs constitute the majority of all ingot shapes at present subjected to the kind of sampling explained herein, the present apparatus has been developed for rectangular slabs. Further, since the majority of slabs are of one given size, one sampling chart has become practically standard and the particular apparatus herein shown has been designed to work according to this chart but may be readily adapted to work according to other charts. Inasmuch as either end of a billet is likely to be taken for sampling, the standard chart provides for taking samples over only half a billet, starting at one end.

Figure 1 shows a slab as it would appear if laid out according to this standard chart or templet. Referring to the coordinates of the sides of the slab and regarding the short side as the abscissa or horizontal axis and the long side as the ordinate or vertical axis there are seen to be twelve horizontal rows of fourteen holes each. Stated another way there are fourteen longitudinal rows and twelve transverse rows of holes. The hole centers in one row may be referred to as a minor series and the centers of a number of such rows as a major series. The holes of the horizontal rows, i. e. the vertical rows in Figure 1 are designated from right to left by small letters $a$ to $n$ inclusive, while the horizontal rows are designated from bottom upward by capital letters, A to L inclusive.

It is customary to drill a slab at one point only, the next at another point, and so on throughout the whole series of the chart. The holes may be drilled in any order but preferably are drilled successively in the order in which the centers occur in rows and the rows in the series. Thus the first slab will be drilled at the point $Aa$, the second at $Ab$, the fifteenth at $Ba$ and the one-hundred and sixty-eighth slab at $Ln$, the chart shown being designed for sampling one hundred and sixty-eight slabs. In Figure 2 several holes are shown in the same slab but in practice, as stated, each slab has only one hole drilled in it.

*General features of the machine*

A machine built to take samples from such billets preferably will provide means for supporting a number of billets in order that some may be operated upon while others are being loaded or unloaded, means for accurately locating the billets at operating stations where they will be sampled according to the chart, means for operating on the billets, and various auxiliary means serving to coordinate the action of the holding, locating and operating means.

Herein (Figures 3 and 4) the supporting means comprises a carrier or frame in the form of a turntable 60 surmounted by a plurality of billet holders or carriages 70. There may be fourteen such carriages, one for each point in a horizontal row of centers according to the chart of Figure 1. Either the movement of the turntable or the location of the billet carriages will serve to locate the billets for operation at successive points along the row. In this machine the spacing of the carriages on the turntable determines the line drilling centers of the billets. This permits the turntable to be rotated through equal angles for each of the fourteen billet positions.

The fourteen carriages on the turntable are numbered 70a to 70n, inclusive, (sometimes referred to as carriages #1 to #14 respectively) to indicate their correspondence to the centers in a horizontal row or line of the chart. The turntable will be assumed to turn left hand (anti-clockwise) and the centers on which the slabs 50 are drilled are indicated on as many slabs as are shown on the machine by the letters of the coordinates of the points according to the chart.

When the turntable has made one revolution and one row according to the chart has been completed, the carriages are adapted to be moved in a generally radial direction to place the billets in position for drilling the next horizontal row. The carriages are shown to be located for drilling along the outer row A and will next be located for drilling along row B. After all of the rows have been drilled the movement of the carriages may for convenience be reversed and the rows drilled in reverse order (i. e. in the order L to A) as the carriages move radially inward. The present machine is built to move the carriages twelve steps radially outward then twelve steps radially inward.

Radial movement is given the carriages to set them for successive lines by setting mechanism including locating mechanism and follower mechanism. The carriages may be moved radially inward by locating mechanism including a locating slide 80 and may be moved radially outward by a follower mechanism including a slide 200. The locating and follower mechanism occupy a fixed position and act on the carriages when they are stopped adjacent thereto during the step-by-step rotation of the turntable.

Means is provided for clamping the billets upon the carriages and the carriages upon the turntable. Specifically, this means includes a clamp arm 220 actuated by any suitable means.

The position at which the carriage setting mechanism is located may be termed the "setting station". The billets may be loaded on the carriages at this position so it may also be designated as the "loading station". At various points about the circumference of the turntable certain mechanisms for operating on the billets may be located. For example, there may be a punch 400 for compacting or compressing the surfaces of the billets located at a "punching station" and a plurality of drills 425 for taking samples located at "drilling stations". Finally the billets may be removed at an "unloading station" beyond the last drilling station. The loading and unloading stations (Fig. 34) are preferably arranged near a track 450 for cars and any suitable means such as cranes, derricks or the like may be employed for transferring the billets between the cars and the turntable.

Figure 6:
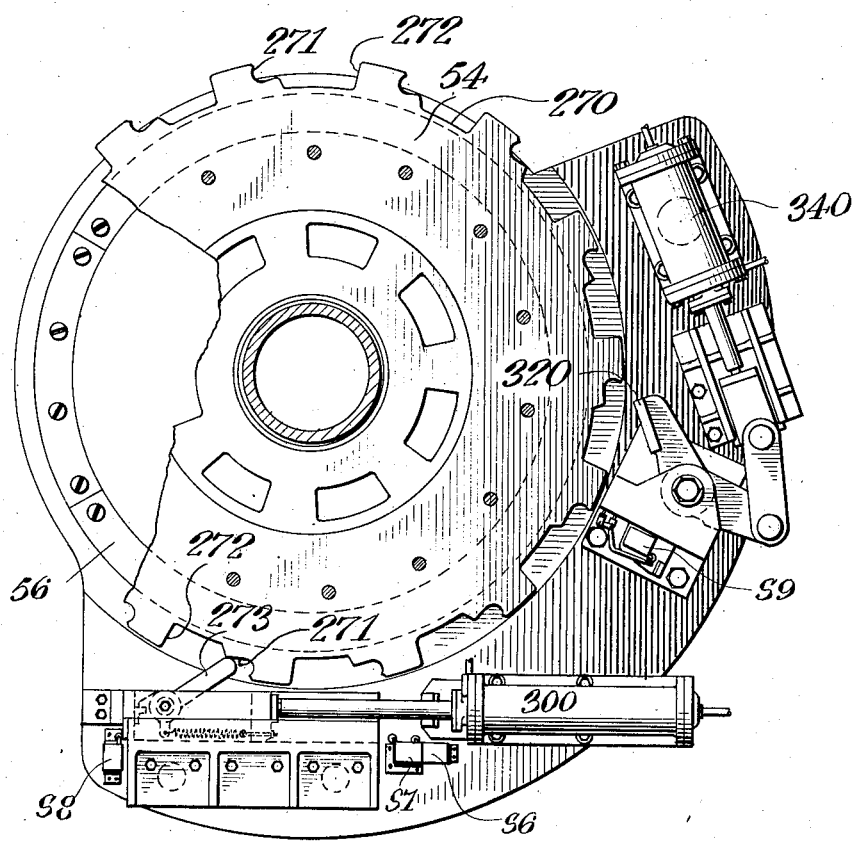
Figure 6 is a horizontal section taken approximately on the line 6—6 of Figure 4 showing certain mechanism for rotating the turntable.
Figure 7:
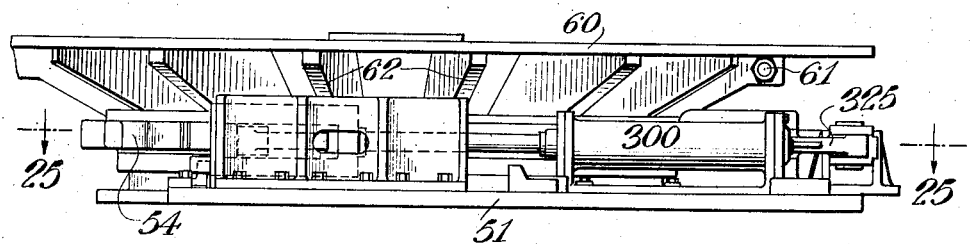

Means is herein provided for giving the carrier or turntable the required step-by-step movement to bring the billets successively to the several stations. As shown in Figure 6 this means may comprise a notched disc secured to the turntable (shown as the hereinafter described bearing plate 54 with notches formed on its edge), a turning mechanism including a power operated pawl 273 and a stop mechanism including a power operated dog 320.

Suitable controls are provided for securing interlocked operation of all parts of the apparatus. These controls provide automatic operation with slight manual supervision at the loading and unloading stations but a central control station 455 (Figure 34) is provided with manual control devices adapted to substitute manual control for automatic control.

Carrier or turntable

At the right of Figure 4 a fixed base 51 is centrally surmounted by a pedestal 52 and intermediately by an annular bearing rail 53. Rotatably mounted upon this base is a turntable bearing plate 54 whose hub is mounted upon the pedestal 52 and whose rim rests upon the rail 53, there being a friction reducing bushing 55 between the plate hub and the pedestal and a friction reducing liner 56 between the plate rim and the rail.

Secured upon the plate 54 there is an annular table 60 which in the present machine, being rather massive, may be formed in two or more parts (see Figure 5) secured together by bolts 61 passing through adjacent pairs of a plurality of spacing ribs 62 formed integral with the upper disc portion serving as the table proper and the lower disc portion 63 serving as a means for attaching the table upon the plate 54.

Billet supports or carriages

Referring to Figure 3 the table 60 is seen to be provided with a plurality (fourteen) approximately radial tracks, each comprising a pair of carriage rails 64 bolted or otherwise attached to the table. Slidably mounted upon these tracks are a corresponding number (fourteen) of billet supports or carriages 70 herein numbered 70a to 70n inclusive in clockwise order around the table.

The carriages are preferably placed upon the turntable in such position that the vertical lines on which their respective billets are to be drilled are true radii from the center of the turntable and the tracks for the carriages are parallel to these radial lines in order that the billet drilling centers may fall along this line as the carriages are shifted radially. This arrangement does not provide equal spacing between carriages nor place the center lines of the carriages in a truly radial direction, the carriages 70g and 70h being the ones which most nearly approximate such a disposition, but the arrangement chosen has many advantages such as permitting the use of turning mechanism acting at all times through equal angles and providing the wide spacing between the end carriages of the group (70a and 70n) which gives a ready visual determination of the status of operations.

To avoid drilling into the carriages themselves the carriages are made so as to support the billet with that part which is to be operated upon projecting beyond its supports. Since half of the holes in a row are on one side of the longitudinal axis of the billet and half on the other side, half of the carriages are arranged to support billets on one side and the other half are arranged to support the billets on the other side. For example, the carriage 70a is seen to have a long arm 71 on the trailing side with respect to the direction of rotation of the turntable while the carriage 70n has its longer arm 71 on the leading side. That is, the carriages 70a to 70g inclusive may be termed "left hand" while the carriages 70h to 70n inclusive may be termed "right hand". Round headed support studs 72 are set one in the outer end of the arm 71 and two in the wide portion of the carriage. The carriages thus constructed are adapted to support the billets at three points, which feature in itself is an advantage since the billets will always rest evenly on all supports even though they may be warped or twisted.

Means is provided for securing the accurate placement of billets on the carriages. This means, as shown in Figure 3, comprises an end gage 85, to be described hereinafter in connection with certain carriage setting mechanism, and side gages 77 secured upon the turntable 60 alongside each of the carriages 70. The mounting for each of these gages comprises a guide base 78 fixed to the turntable 60 and an adjusting bolt 79 rotatably held in the gage and threaded through an upstanding portion of the guide base. The side gages are located on the side of their carriages which places them nearest the hole center on which the billet is to be drilled. Hence the gages for carriages 70a to 70g are located on one side and the gages for carriages 70h to 70n are located on the opposite side.

*Outline of operations*

In Figure 3 on carriage 70d a billet of one linear series is shown at the unloading station ready for removal, three billets of that series having already been removed from carriages 70a, 70b and 70c. The first billet of a new series has just been placed on carriage 70a at the loading or carriage setting position. All of the carriages except 70a are shown at their innermost positions for drilling the outer end row of holes.

The billet on carriage 70m is located at the punch in position to be acted upon by the punch to compress or compact the metal for the hole Am. Actually as will subsequently be explained the punch is cut out and does not operate either for this end row (A) of holes or for the two side rows of holes (a and n) because of the fact that the billets have sloping edges and these might be broken off or because of the sloping sides the billet might be pushed out of position by action of the punch. The billets on carriages 70f, 70g, 70h, and 70i are located respectively beneath drills #4, #3, #2, #1 for drilling holes at the points Af, Ag, Ah and Ai. The drills operate more slowly than the other mechanisms about the turntable so four drills are provided and each drill bores a portion of each hole and is withdrawn, the hole being completed when the billet is at the fourth drill.

After each revolution of the turntable the carriages are moved radially one step. The outermost position of the carriages is indicated by the dotted line position of the carriage 70n and the outermost position of the end gauge 85 is indicated by the dot and dash circle.

CARRIAGE SETTING MECHANISM

*Carriage locating mechanism*

As each carriage stops at the setting or loading station it is moved to a new radial position before a billet is placed on the carriage. This is accomplished (Figures 3 and 4) in part by a locating slide 80 mounted on a frame 81 outside the periphery of the turntable. This mechanism is shown more particularly in Figures 8 to 16 inclusive.

In Figure 14 the slide 80 is seen to be provided with grooved shoes 82, closely fitting guide ribs 83 formed on the frame 81. Thus mounted the slide is capable of endwise movement but cannot separate from its guides. Referring to Figure 10, the inner end of the slide 80 is provided with a push bar 84 adapted to engage the end of the long arm 71 of a carriage, the bar being itself sufficiently long to operate properly on all carriages whatever their spacing and whether right hand or left hand. Above the bar 84 (Figures 8, 9 and 10) is mounted an adjustable billet end gage 85. The gage operates upon guides 86 formed on the top of the slide and may be adjusted by a hand turned setting bolt 87 rotatably but non-slidably mounted in a fixed bearing 88 and threaded into the back of the gage 85. This gage may be adjusted to insure the very accurate locating of a billet whether its carriage is accurately located or not. The gage thus serves to compensate for wear on the locating mechanism.

Referring to Figure 3, the bar 84 has pivotally connected thereto an adjustable guard rail 84a serving not only to protect the operator from injury but to direct the billet carriages into approximate position, it being later seen that the carriages after passing the unloading station are left unclamped upon their rails.

As shown in Figures 8 and 11 the slide 80 toward its front end is provided with an inspection opening 80a closed by a cap 89 and toward the rear end is provided with another inspection opening 80b.

Referring to Figure 8, the slide 80 is moved inward by a placement motor comprising a fixed cylinder 90 and a piston 91 attached beneath the slide 80 by a yoke 92 bolted by set screws 93 or otherwise secured to the slide 80 and held on the stem 94 of piston 91 by locknuts 95. The cylinder 90 of the motor is secured in any suitable manner to the frame 81, for example, by side lugs 96 and cap screws 97. The piston may be hydraulically operated by water or oil under pressure travelling through a pipe 98 controlled (Figure 35) by a solenoid operated valve V1. The piston stem 94 may be sealed by packing held by a packing gland 99.

Slide retracting mechanism

Still referring to Figure 8, the locating slide 80 at its rear end has securely attached thereto the cylinder 100 of a retracting motor. The means by which the cylinder is attached to the slide is shown in Figures 9 and 12. A yoke 101 is attached to the lower side of the slide by set screws 102. The cylinder 100 is provided with bosses 103 on either side drilled longitudinally to receive studs 104 threaded into the yoke 101. The cylinder bosses fit against shoulders on the studs and are rigidly secured by nuts 105 threaded on the outer ends of the studs.

A piston 106 operates within the cylinder 100 and is attached to or made integral with a piston rod 107 having a stop flange 108 adapted to abut the end of the cylinder to limit the retracting movement of the piston. A reduced portion 109 of the piston rod is guided within a bore through the yoke 101, which bore may be lined with a friction reducing bushing 111. A spring 112 disposed between the yoke 101 and the piston flange 108 constantly urges the piston into the cylinder.

The end of the piston rod 107 has removably secured within a socket thereof a stop pin 113 which is hardened on the end for wear. This stop pin operates upon the steps of a line-gauge drum 115 mounted for controlled intermittent rotation to bring a new step in front of the piston stop pin every time the turntable makes one complete revolution to bring the carriage 70a to the locating station.

The retracting motor is operated by compressed air entering the cylinder 100 through a pipe 116 leading to a coupling 117 anchored by an angle plate 118 and set screws 119 to the end of the slide 80. The coupling 117 carries a telescopic pipe 120 entering and slidable through a stuffing box 121 and a larger telescopic pipe 122 threaded into the rear side of the stuffing box 121. The stuffing box 121 is provided with ears 123 secured to a part of the stationary frame 81 by set screws 124. Packing may be retained in the stuffing box about the smaller telescopic pipe 120 by a gland 125 secured to the stuffing box 121 by set screws 126. The flow of air to the cylinder 100 by way of the pipe 122 may be controlled (Figure 35) by a solenoid valve V2.

Line-gauge drum operating mechanism

Means is herein provided for rotating the line-gauge drum 115 in proper sequence so as to bring a new step of the drum into position for engagement by the stem 113 of the retracting piston at each complete rotation of the turntable. This means is shown particularly in Figures 8, 12, 14, 15 and 16.

As seen in Figure 8 the step drum 115 is formed with a hub 130 secured to a shaft plate 131 by a cap 132 and a stud 133. In order to prevent turning between the drum and the plate a key 134 is driven through the hub of the drum into the flange.

The plate 131 is formed integral with or rigidly secured to a drum shaft 135 rotatably mounted in a bearing 136 formed on the frame 81, the bearing preferably being provided with a friction-reducing bushing 137. A flange 138 is formed on the bushing 137. Adjacent this flange a friction collar 139 is screwed upon the shaft 135 to bring up tightly against the flange 138. The friction between the collar 139 and the flange 138 will be sufficient to cause the shaft 135 to bind in its rotation and be held in any position to which it may be turned. Set screws passing through the collar 138 and anchored upon the shaft 135 prevent loosening of the collar.

Upon a reduced portion of the shaft beyond the collar 138 a ratchet wheel spider 140 is rigidly secured to the shaft 135 both by a key 141 and a set screw 142. To the outer edge of the spider 140 a ratchet wheel rim 144 is secured by a plurality of bolts 145. Upon the further reduced outer end of the shaft 135 there is loosely mounted a ratchet crank 146 held upon the shaft by a washer 147 and a cap screw 148.

Referring to Figures 12 and 14, the ratchet crank 146 is provided with a pawl arm 149 provided with a journal pin 150 upon which are mounted two pawls 151 operating respectively upon two axially spaced sets of notches 152, 153 on the periphery of the ratchet wheel rim 144. The pawls are urged toward the notches by springs 155 attached to fingers 156 on the pawls 151 and to eyebolts 157 secured to ears 158 of a bent portion 159 of the pawl arm 149. One of the pawls only is engaged with its ratchet notches at a given time, the other at that time, as shown in Figure 14, being held away from its ratchet notches by a hook 160 pivoted upon a pin 161 secured to the outer end of the straight portion on the ratchet arm. One of the sets of notches (that one being used—153) has twenty-four teeth corresponding to the number of steps on the line-gauge drum being used. The other set of notches 152 is adapted to be used when a different drum is used. For example, since there are twenty teeth in the other set it will be used with a drum having twenty steps, the latter arrangement being employed when the templet or chart by which the billets are to be drilled contains ten instead of twelve horizontal rows of hole centers.

Power means is herein provided for giving the ratchet wheel a step-by-step movement. This means (Figures 12, 14, 15 and 16) includes a ratchet motor having a power cylinder 170 attached to a bed 171 formed integral with or secured to the frame 81 by studs 172 passing through spaced pads 173, 174 of base and cylinder respectively. Referring to Figure 15, a piston 175 operates within the cylinder 170, the piston being provided with a piston rod 176 projecting through a stuffing box 177 and gland 178 provided in the end of the cylinder. The outer end of the piston rod 176 is attached to a crosshead 179 slidably mounted in the bed. The crosshead extends in a flat stem 180 toward the head of the cylinder where side lugs 181 are formed on its other end, the lugs operating between the spaced pairs of pads 173, 174 to limit the piston movement.

Attached to the crosshead (Figure 14) by a wrist pin 184 is a pitman rod 185 attached at its other end by a crank pin 186 to the crank arm 187 of the ratchet crank 146. The piston is adapted to be actuated by hydraulic pressure. Normally the piston is urged toward the "head" end of the cylinder by constant pressure and is forced when required toward the "crank" end (herein "crank end" refers to the end opposite the head end, whether or not a crank is actually employed) to operate the ratchet one step by a variable (valve controlled) pressure which acts upon a larger area than the constant pressure and thus overcomes the force exerted by the constant pressure. Referring to Figure 15, the fluid for exerting constant pressure is admitted to the crank end of the cylinder through a pipe connection 189 while fluid under variable pressure is admitted to the other end of the cylinder through a pipe connection 190. A solenoid valve V5 (Figure 35) may be employed to regulate the flow of fluid to the pipe connection 190 for exerting the preponderating variable pressure.

*Carriage follower mechanism*

Cooperating with the locating slide 80 to set the carriages in proper position is a follower slide 200, previously mentioned, included in the follower mechanism which also includes power means for actuating the slide. This mechanism is shown in its relation to the general assembly in Figures 3 and 4. In Figures 17, 18 and 19 it is illustrated in more detail.

In Figures 3 and 4 it is seen that the follower mechanism is located within the opening of the annular table 60, being mounted on a bracket 201 secured to the top of the pedestal 52 (see also Figure 17) by bolts 202. The outer end of the slide is arranged to act upon carriages in line with the slide 80 but in the opposite direction. The end of the slide 200 need not be made as wide as the end of slide 80 since the rear ends of the carriages present a wider surface of engagement for the slide. Even though the carriages are not uniformly spaced on the turntable, still the end of the slide will always engage some part of the carriage.

The means provided for operating the slide 200 in Figures 17 to 19 comprises a fluid motor having a follower cylinder 205 within which operates a follower piston 206 attached at its outer end to an upstanding portion 207 of the slide. As seen in Figure 19, the cylinder is provided with longitudinal ribs 208 attached to upstanding walls 209 of the supporting bracket 201 by set screws 210. The slide has a tongue 212 adapted to fit between the walls 209 beneath the cylinder which is provided with a squared portion 213 also fitting between the walls. At the instroke of the piston the movement of the slide is limited by engagement of the end of its tongue 212 with a stop-plate 214 secured to the bracket 201 by set screws 215.

The piston within the follower cylinder 205 is adapted to be operated in both directions by hydraulic pressure, on the outstroke by variable pressure and on the instroke by constant pressure acting upon a smaller surface area. Thus as in the case of the gage cylinder when the variable pressure acts it exerts a preponderating influence on the piston tending to move it out of the cylinder. In Figure 17 a pipe 216 is shown entering the crank end of the cylinder for admitting fluid to exert a constant pressure. At the head end a pipe 217 is employed for the flow of fluid exerting variable pressure. The latter pipe may be controlled by the same valve V1 (Figure 35) as that controlling the flow of fluid to the placement cylinder 90, wherefore the slides 80 and 200 converge simultaneously.

*Operation of the carriage setting mechanism.*

When the carriage arrives at the setting station it is acted upon concurrently by the slides of the locating and follower mechanism. The placement motor employed to move the locating slide is more powerful than the follower motor employed to move the follower slide, hence it will move the carriage inward until it is stopped by other means.

This inward and follower-opposed movement of the locating slide is limited by the line-gage drum 115. By reference to Figure 8, it will be seen that when the locating slide moves inward it will carry with it the retracting cylinder 100 bolted to it, which cylinder will bring up against the stop flange 108 of its piston rod 107 and the piston rod (through its stop pin 113) will bring up against one of the steps of the drum 115. Thus a solid engagement between the slide and the drum is established and the slide is not allowed to move further inward but is accurately stopped in a definite predetermined position.

Each carriage is located as it comes into position. When the turntable turns, the carriage setting mechanism must be clear of the carriage and turntable. The follower mechanism is returned by constant pressure acting upon the crank-end face of the follower piston after the variable pressure has been cut off and exhaust opened at the head end. The placement cylinder merely has its pressure cut off and is opened to exhaust, and the slide is returned by the retracting mechanism. Air pressure is admitted to the head end of the retracting cylinder and since the piston is prevented from movement to the right by reason of its stop pin resting on one of the steps of the drum, the cylinder itself will be moved out carrying the slide with it. Thereafter pressure is cut off from the retracting cylinder and the spring 112 acting against the yoke 101 fixed to the slide will press upon the stop flange 108 to force the piston into the cylinder until the flange brings up against the end of the cylinder. This retracting movement of the piston under the influence of the spring is of sufficient magnitude to raise the stop pin at least through the rise of one of the steps of the drum, thus permitting the drum, which is turned once each revolution of the turntable while the stop pin is retracted, to bring a higher step beneath the pin.

After one row of holes has been completed at one rotation of the turntable the next step of the drum is brought beneath the stop pin by the gage mechanism previously described. After the stop pin has moved down upon each descending row of steps it will thereafter commence to ascend the other row to carry the slide outward.

The line-gage drum 115 shown in the drawings, as brought out above, is made for a twelve-row templet. Other standard templets may have different numbers of rows of holes or may have different row spacings. In such cases the drum may be readily removed and replaced by another one made according to the required dimensions. Likewise the ratchet rim 144 may be quickly removed and replaced by another having different numbers of notches. The single rim shown has two sets of notches for selective use for ten-row as well as twelve-row templets. Obviously the number of sets of notches could be increased to any limit but two provide for ordinary requirements.

A templet may have fewer vertical rows as well as fewer horizontal rows. In such a case all of the fourteen carriages are not necessary so are not loaded with billets. To take care of the changed line spacing the side gages 77 for the billet carriages may be adjusted as required. If, for example, there are only twelve vertical rows of holes, i. e., only twelve instead of fourteen holes in each horizontal row, two of the carriages are left vacant at each revolution. Preferably in this case the carriages 70*g* and 70*h*, the adjacent ones of the left and right sets on which the billet holes come nearest the central longitudinal axis, are the ones left vacant. As will be explained hereinafter means is provided for cutting out the punch and drills when the empty carriages pass them.

*Billet clamping mechanism.*

As explained above a billet is placed on a carriage so as to rest equally on the three support studs 72 and with one side and one end edge respectively touching the side gage 77 and end gage 85. Means is herein provided for clamping the billet upon its supports, the point of application of the clamping pressure being within the triangular space defined by lines joining the three points of support.

As shown in Figures 20 to 24 the clamping means selected for illustration comprises a vertically movable clamping arm 220 operated by any suitable means such as a fluid motor including a movable clamping cylinder 225 and a fixed piston 226. The piston is provided with a piston rod 227 screwed into the top plate 229 of an auxiliary carriage 228. The auxiliary carriage is hinged to the carriage 70, having (Figure 22) arms 230 embracing the sides of the carriage 70 and pivoted thereto by hinge bolts 231. The auxiliary carriage like the billet carriage 70 is provided with rail-embracing shoes (not shown, but analogous to those indicated at 73 in Figure 21) holding it slidably upon the rails 64.

The cylinder 225 is guided in suitable fashion. As shown, from the sides of the carriage top plate 229 extend cooperating guide standards 232 provided with vertical grooves 233 receiving H-shaped slides 221 embracing and secured to vertical ribs 234 of the cylinder 225 by countersunk screws 235. One or the other of these slides 221, depending on whether the carriage is right hand or left hand, will be formed integral with the clamping arm 220. Above the slides 221 within the grooves 233 cylinder stops 237 are secured by set screws 238 for limiting the outward movement of the cylinder 225.

A head 240 is secured on the upper end of the cylinder 225 by set screws 241. The other end of the cylinder is formed integral with the cylinder side walls and is provided with a bore 242 and a bushing 243 for the piston rod 227, the bore being enlarged at its lower end to receive piston rod packing held in place by a packing gland 244.

The clamping motors of the several carriages are adapted to be operated by compressed air, using constant pressure in the lower end of the cylinder for lowering the cylinder to bring the clamp 220 down upon a billet and employing variable pressure acting over a larger area in the upper or head end of the cylinder for raising it to retract the clamp from the billet. For supplying compressed air there is provided (see also Figures 3 and 4) a pipe fitting 250 secured upon the table 60 at the rear end of each carriage below the slide 200 of the follower mechanism. These pipe fittings 250 may have connection in any suitable way with a fixed source of supply through any usual slip joint connections (not shown). Referring to Figure 20, the pipe fitting 250 is equipped with a telescopic pipe 251 entering a bore 252 extending through the top plate 229 of the auxiliary carriage 228, the bore 252 being enlarged beneath the lower end of the piston rod 227 to form a chamber. Leakage from this chamber is prevented at the end nearest the fitting 250 by packing held in place by a packing gland 253. At the other end the bore 252 is provided with an enlarged cap 254 fitting over the end of the telescopic pipe 251. The distance between the end of the cap 254 and the packed joint at the other side of the plate 229 is sufficient to accommodate for the extremes of movement of the carriage.

The hole into which the lower end of the piston rod 227 is threaded opens into the enlarged chamber of the bore 252 and the piston rod 227 is provided with a central channel 256 opening at the lower end through the end of the piston rod and at the upper end opening through the side of the piston rod into the space beneath the piston within the cylinder 225. This channel 256 provides a constant pressure beneath the piston in the lower end of the cylinder for keeping the clamping arm depressed.

A by-pass is arranged between the lower end of the cylinder and the upper end of the cylinder to supply live fluid to the other side of the piston. This by-pass comprises a channel 257 in the lower end of the cylinder, a channel 258 in the upper end of the cylinder and a pipe 259 connecting the channels 257 and 258. Intermediate its length the pipe 259 is provided with a three-way valve 260 capable either of permitting a straight flow through the pipe 259 or of connecting the upper end of the pipe 259 to an exhaust nipple 261 when the lower end of the pipe is shut off. By this construction the same body of air employed in the lower end of the cylinder for exerting constant pressure may be by-passed to the upper end of the cylinder where, acting upon the greater piston area it is able to overcome the constant pressure and raise the cylinder and clamping arm. If desired, automatic means may be provided for actuating the clamping motor in cooperation with the other mechanisms of the apparatus but in the present embodiment of the invention this is not done, the by-pass valve being merely provided with a handle 262 for manual control.

*Operation of clamping mechanism*

As soon as the operator places a billet on the carriage against the gages 77 and 85 (these gages being accurately located) he may operate the valve 260 to clamp the billet on the carriage. Or he may place the billet on the carriage against the gages and wait until the carriage setting mechanism has operated and withdrawn before he clamps the billet on the carriage. When the clamping arm acts it not only presses the billet upon the carriage but binds the carriage 70 tightly upon its tracks so that there is no danger of its position changing while traveling past the operating mechanisms around the turntable. While the clamping action forces the billet carriage down on its rails it will tend to lift the auxiliary carriage 228 from the rails and it is for this reason that the hinge connection between the two carriages is desirable, otherwise there might be a tendency for the clamping action to put an undue strain on the carriage castings and moreover, if the carriage were all in one piece the clamping means would not bind the billet carriage upon its tracks to prevent unwarranted movement.

Turntable operating mechanism

As described in connection with Figure 6, the turntable bearing plate 54 is provided with notches in its periphery adapted to be operated upon by turning mechanism to advance the turntable one step and by stopping mechanism cooperating with the turning mechanism to insure that the turntable is stopped accurately in a predetermined position. There are fourteen notches in the periphery of the plate 54 corresponding to the fourteen carriages on the turntable. Each notch 270 is formed on one side with a tangential jog 271 and opposed to this a radial face 272. The jog is adapted to be engaged by a pawl 273 operated by the turning mechanism and the radial face 272 is adapted to be engaged by the dog 320 of the stop mechanism.

Turntable turning mechanism

Attention will first be directed to the turntable turning mechanism shown in Figures 25 to 28. The pawl 273 is pivoted upon a pin 276 carried in a crosshead 277. This crosshead is guided (Figure 27) by flanges 278 operating at the upper side of the crosshead within a groove 279 of a guide 280 and at the lower side by a groove 281 formed between the vertical side of the guide 280 and a crosshead supporting strip 283. The guide 280 may be secured to the base of the machine by set screws 284 while the strip 283 may be secured to the base by countersunk screws 285. A stop 289 secured to the base by cap bolts 290 limits the outward movement of the crosshead. Preferably the pawl 273 is loose on the pin 276 and the pivot pin is screwed into position and held by a set screw 275. The pawl is constantly urged toward the face of the notched plate by a spring 291 attached to one end of the crosshead by the eye bolt 292 and acting at its other end upon an arm 293 of the pawl. The pawl is also provided with a lug 294 serving to limit the inward movement of the pawl by striking the pawl stop 295 secured to the outer end of the crosshead by cap bolts 296.

Figure 26:
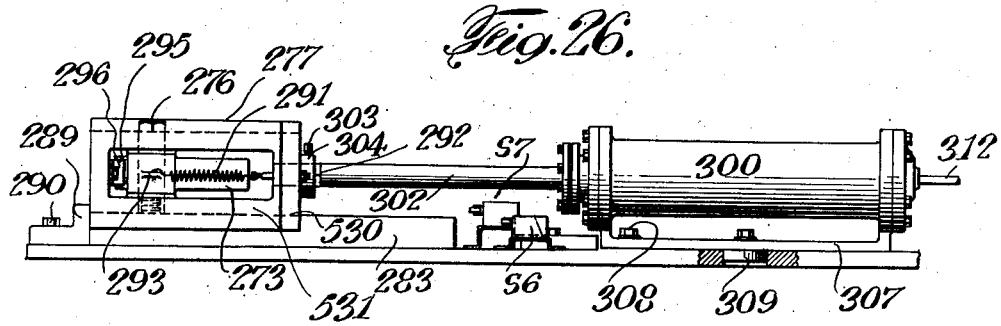
Figure 26 is a section taken on the line 26—26 of Figure 25.
Figures 27, 28:
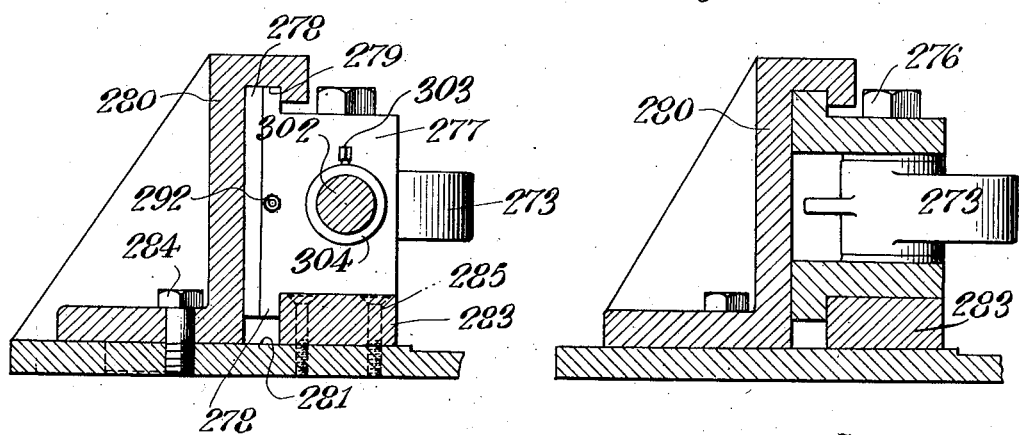
Figure 27 is a section taken on the line 27—27 of Figure 25.
Figure 28 is a section taken on the line 28—28 of Figure 25.

The crosshead 277 may be operated by any suitable means. In the present embodiment it is operated by a turntable turning motor comprising a turning cylinder 300 within which operates a piston 301 provided with a piston rod 302 screwed into the end of the crosshead and held in proper position by a set screw 303 passing through a flange 304 attached to the crosshead. The piston rod may be packed where it passes through the crank end of the cylinder by packing held in place by a packing gland 305. The cylinder casting may include a flat base portion 307 attached to the base of the machine by set screws 308, the base portion in addition, as shown in Figure 26, being, if desired, provided with a lug 309 anchored in a socket in the base of the machine.

The turning motor may be operated by hydraulic pressure,—fluid under constant pressure being admitted to the crank end through a pipe connection 311 to retract the piston into the cylinder to turn the turntable,—and fluid under variable pressure controlled by a solenoid valve V3 (Figure 35) being admitted to the head end of the cylinder through a pipe connection 312 to advance the piston to catch the pawl in a new notch.

Turntable stop mechanism

The mechanism for stopping the turntable in a definite position is shown on the right of Figure 6 and more particularly in Figures 30 to 33. Here the stop dog 320 is seen to be pivoted upon a pin 321 passing through the spaced side plates (see Figure 32) of a fixed mounting 322 held upon the base of the machine by cap screws 323. The face of the dog which is adapted to operate upon the flat face of the notched teeth is provided with a hardened removable wear plate 324 attached to the dog by any suitable means. An arm 325 is formed integral with or fixed to the dog and this arm at this outer end is connected by a pivot pin 326 to a connecting rod 327, which connecting rod is pivoted at its other end by a pin 328 to a crosshead 330. Movement of the dog in a clockwise direction, as viewed in Figure 30, is limited by a raised portion 331 of the arm 325 coming into engagement with an edge of the mounting 322 while movement in the other direction is limited by the face of the hardened wear plate 324 coming into engagement with a flat face 333 on the other side of the fixed mounting 322.

The crosshead 330, as shown in Figure 31, is provided on either side with slides 335 operating in grooves 336 formed in the upstanding walls 337 of a guide 338 attached by cap screws 339 to the base of the machine.

The crosshead and dog may be operated by any suitable mechanism. As herein shown, they are adapted to be operated by a stop motor including a stop cylinder 340 and a piston 341 therein, the piston having its connecting rod 342 screwed into the crosshead 330 and held from turning therein by any suitable means. The piston rod may be packed where it passes out of the crank end of the cylinder by packing held in place by a packing gland 345. The cylinder 340 is provided with a flat faced base portion 347 fastened to the base of the machine by cap screws 348. If desired, the cylinder base 347 may be provided with a lug 349 entering a socket in the base of the machine. The stop motor may be operated by hydraulic pressure, being supplied at the crank end by way of a pipe connection 351 with fluid under constant pressure to retract the piston into the cylinder to stop the turntable, and being supplied at the head end by way of a pipe connection 352 with fluid under variable pressure for forcing the piston out of the cylinder to withdraw the dog clear of the rotating turntable plate. The flow of fluid through the pipe connection 352 may be controlled (see Figure 35) by a solenoid operated valve V4.

Controls

Means is herein provided for controlling the operation of the various moving parts of the machine to secure coordination in their operation. This means comprises controls adapted to provide automatic operation or alternatively to provide manual operation, i. e., operation of the moving units individually instead of in groups as in the automatic operation. However, the manual operation provides that certain related parts will still operate in coordination in their proper sequence as will be apparent hereinafter.

The provision herein made is that all of the moving parts with the exception of the billet clamping mechanism are subject to automatic control. This also might by the use of controls similar to those now to be described be subjected to automatic operation but it is found more convenient simply to have the operator control the clamping mechanism by the hand operated by-pass valve 260.

Pilot valves

Movement of the various fluid actuated pistons is instigated in each case by a solenoid operated pilot valve. It is not to be understood that these valves directly regulate the flow of fluid into the cylinders although they are shown in Figures 34 and 35 in such a way as to give this inference. Actually, suitable devices are interposed between the valves and the cylinders, such for example, as are shown and described in my application Serial No. 94,334 filed March 12, 1926. Herein it is sufficient to understand merely that when the pilot valves are actuated the movement of the ultimate power piston associated therewith ensues.

Referring to Figures 34 and 35 it is found that the flow of hydraulic fluid into the placement cylinder 90 is controlled by the solenoid operated pilot valve V1. Since the outward movement of the follower piston 206 is coincident with the inward movement of the placement piston 91 it is arranged that the valve V1 shall also control the flow of hydraulic fluid into the follower cylinder 205.

The flow of compressed air to the retracting cylinder is controlled by the solenoid operated pilot valve V2.

The flow of hydraulic fluid to the turntable turning cylinder 300 is controlled by the solenoid operated pilot valve V3 and similarly to the turntable stop cylinder 340 by the valve V4.

The pilot valve V5 controls the flow of variable pressure fluid to the ratchet cylinder 170.

The punch 400 is provided with two cylinders 401 with corresponding pistons 402 which are operated by variable hydraulic pressure under control of the single pilot valve V6 on the power stroke and by constant pressure acting on a smaller piston area on the return stroke.

The flow of fluid under variable pressure to the cylinders 426 and pistons 427 of the drills 425 numbered #1, #2, #3 and #4 is controlled by the pilot valves V7, V8, V9 and V10 respectively.

The solenoid coils of the valves V1 to V10 are designated respectively by the same symbols with the suffix C, as V1—C, V2—C, etc.

Primary switches

The moving parts are provided with mechanically operated switches,—for convenience of description designated as primary switches—adapted to secure the proper related movements of these parts and to prevent improper movement of them.

Referring to the diagrammatic Figures 34 and 35 and the structural Figures 11 and 13, the locating slide 80 at its inner end is provided with the normally open switch S1, a hinged bar 500 (see also Figures 8 and 10) being mounted on hinge pins 501 in position to strike the ends of the carriages and move a push rod 502 against the switch operating arm. A spring 504 normally holds the push rod and bar in off position as viewed in Figure 8.

Referring to Figures 34 and 35 and the structural Figures 8, 11 and 12, a normally closed switch S2 and a normally open switch S3 are mounted on the side of the slide 80. A switch operating bar 510 is secured to the stop flange 108 of the retracting piston 106 by cap bolts 511. The bar operates within strap guides 512 attached to the under surface of the slide by studs 513. At one end of the bar a cam piece 514 is secured in position to strike the operating arms of the switches S2 and S3.

Referring to Figures 34 and 35 and the structural Figures 17, 18, 20 and 22, the follower cylinder 205 has mounted thereon a normally open switch S4. The follower slide 200 has mounted on its upstanding portion 207 a normally open switch S5 adapted to be closed by striking against a rear wall 520 of the auxiliary carriages 228 when the slide is moved out against the carriages. The casing of the switch S5 on the slide carries a switch operating plate 521 adapted to strike the operating arm of switch S4 when the slide moves back.

Figure 25:
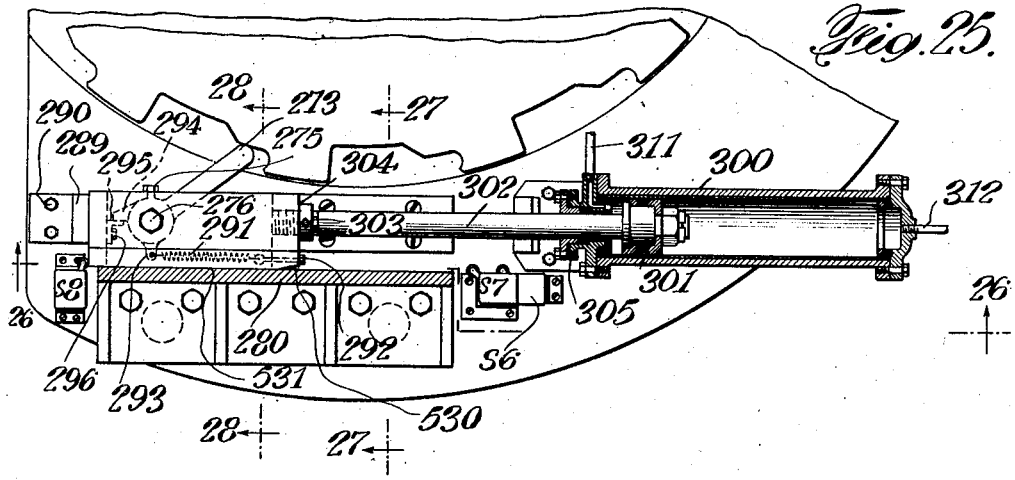
Figure 25 is an enlarged partial section taken on the line 25—25 of Figure 7, showing the turntable turning mechanism alone.

Referring to Figures 34 and 35 and the structural Figures 25 and 26, the machine base adjacent the turntable turning motor forms a mounting for the spring opened but normally closed switches S6 and S7 located at the head end of the crosshead 277 and the normally open switch S8 located at the crank end of the crosshead. The crosshead is provided with a cam face 530 and a straight face 531 adapted to operate the switches S6 and S7 while the switch S8 is operated by the square end surface of the crosshead.

Referring to Figures 34 and 35 and the structural Figure 30 the stop motor mounting 322 provides a support for a spring opened but normally closed switch S9. For operating the switch a push pin 540 extends through the body and face 333 of the mounting 322 into position to be engaged by the hardened wear plate 324 of the stop dog 320. The outer end of the push rod is pivoted to the short arm of a switch operating lever 541 intermediately pivoted upon a fixed bracket 542. The arm of the lever which engages the switch operating roller is considerably longer than the arm to which the push rod is attached so that only a slight movement of the push rod is required to operate the switch.

Referring to Figures 34 and 35 and the structural Figures 14 and 16, the bed 171 of the ratchet motor provides support for the spring opened switches S10 and S11. The switches are operated by cams 550 and 551 secured by screws 552 to the ends of the lugs 181 formed on the cross-head stem 180. In the circuit the switch S10 is normally closed due to constant pressure acting on the crank end of the piston while the switch S11 is normally open.

Still referring to Figures 34 and 35 there is found associated with the ratchet motor the normally closed switch S12 and the normally open switch S13. These switches are employed for interrupting the normal cycle and causing the ratchet motor to turn the line gage drum at the end of each revolution of the turntable as carriage 70x (i. e. #1) comes into loading position. Suitable cams C12 and C13 are provided on the turntable for operating the switches at the proper time once each revolution.

The punch 400 having two pistons 402 is provided with a switch for each capable of insuring the full return of the pistons before the turntable can be turned. These switches S14 and S15 which spring open when not held are closed by suitable operators or cams 403 when the pistons are fully back. In the circuit they may be referred to as normally closed interlock switches.

When the punch pistons move out the hydraulic pressure on them begins to build up. It is desirable to have means to secure the return of the pistons when the pressure has reached predetermined limit. This is provided by a pressure limiting device, the cylinder 404 of which is connected to the fluid main and the piston 405 of which operates against a spring 406 resisted by a fixed bracket 407. The outer end of the piston rod actuates a normally open switch S16 having proper circuit connections to secure return of the punch pistons.

As previously mentioned it is desirable to cut out the punch for the end row of holes (A) falling above the beveled ends of the billets. To this end a normally open switch S17 is associated with the punch. It may be located near the punch as by being mounted upon the punch frame or some other fixed part adjacent the turntable. The billet carriages are provided with cams C17 which in the innermost position of the carriages are adapted to operate the switch S17. The cams are omitted from the strictly structural figures for clarity but it will be understood that they will be located where they will not interfere with the punch, drills or other parts in the rotation of the turntable and the radial travel of the carriages.

It will be noted that the carriages #1 and #14 are not provided with cams C17, this being unnecessary since the punch is always cut out for these carriages by other means. This is desirable since carriages #1 and #14 carry those billets which are to be drilled along the vertical rows of holes $a$ and $n$ falling above the beveled longitudinal edges.

To effect this, the normally closed switch S18 is associated with the punch as by being mounted on its frame or upon some other fixed part adjacent the turntable in proper position to come in the path of the operating cams C18 which are formed on the turntable to serve carriages #1 and #14. Again the switch and cam mountings are shown only in Figures 34 and 35 but such mountings may be of various form and suitable ones may be readily devised by those skilled in the art from the essential suggestions furnished in Figures 34 and 35.

It has been noted that when a step drum made for twelve instead of fourteen billets is employed, carriages #7 and #8 are left empty. Wherefore it is desirable to cut out the punch and the four drills when these empty carriages pass them. Accordingly, the punch and four drills have associated with them the normally closed switches S19, S22, S25, S28, S31 respectively, the switches being mounted on suitable fixed supports in a path concentric with the axis of the turntable. Adjustable cams C19 are mounted upon the turntable in such a manner as to be capable of being moved out and set in position to come against the switches when the carriages #7 and #8 come beneath the punch or drills.

Suitable means is provided for securing return of each drill when it reaches the end of the stroke for which it is set as well as for registering the full return of the drills, the latter for insuring the proper movement of the turntable when the drills are back but preventing its unauthorized movement when the drills are operating. The stroke limiting means comprises normally open switches S21, S24, S27 and S30 for the drills #1 to #4 respectively while the return registering means comprises the normally closed but spring opened interlock switches S20, S23, S26 and S29 for the four drills. The drills are conventionally shown to be provided with switch operating members 428 capable of actuating the two switches associated with each drill.

Relays

Suitable devices are interposed between the solenoid operated pilot valves and the primary switches or other controls provided for securing properly coordinated movements of all power units. Herein these devices comprise relays or contactors. In the wiring diagram (Figure 35) the relays are shown in vertical alignment with the power units with which they are principally identified or with the general controls. Only a brief mention of these relays will here be given, their use being shown by an outline of operations to be given hereinafter.

Among the general controls in the column at the left of Figure 35 are found the main line relay R1, the change over (from manual to automatic operation) pilot relay R2, the relay R3 and the change over master relay R4. The coils and blades of the above and all relays subsequently mentioned are designated by the symbol used for the relay with the suffix —C for the coil and —B for the blade. Thus the coil for relay R1 becomes identified as R1—C and the blade R1—B.

The contacts for the automatic side of relay R4 are designated as A1 to A32 inclusive and those on the manual side as M1 to M26 inclusive.

The change over master relay R4 is conventionally shown as of the gravity type and made up as a single unit but in practice may be of the horizontal shaft or other type and may be made in several units wired for simultaneous movement.

With the carriage locating mechanism there is associated the relay R6; with the follower mechanism, the relays R7 and R8; with the turntable turning mechanism the relays R9 and R10; with the turntable stop mechanism, the relays R11, R12 and the time relay RT; with the drum ratchet mechanism, the relay R13; with the punch the relays R14, R16 and the differential relay R15 with coils R15—C1 (upper) and R15—C2 (lower); with drill #1, the relays R17 and R18; with drill #2, the relays R19 and R20; with drill #3, the relays R21 and R22; with drill #4 the relays R23 and R24; and with the unloading station, the relay R25.

Manual controls

A double bladed bus switch S.B. is provided to connect up with the power supply and a control PB1 with a momentary make push button "start" and a momentary break push button "stop" is arranged at some location convenient to the apparatus, preferably at the central control panel.

At the loading station a momentary break push button PB2 is located. This button is in series with the control PB1 "stop" to provide prompt stoppage of the apparatus if necessary or desirable. The loading station is also provided with a momentary make push button PB3—"go" for starting the operating cycle after a billet has been placed on a carriage and clamped. Further, certain switches PB4 and PB5 are provided to control operation when the apparatus is under manual control.

Associated with the turntable turning mechanism there is a switch PB6 employed in manual operation. Similarly the stop mechanism is provided with the manual control PB7. For the drum ratchet mechanism PB8 is provided.

The punch and four drills respectively have associated with them the throw switches PB9, PB13, PB15, PB17 and PB19 which are kept closed during automatic operation if it is desired that the punch and drills function in the cycle of automatic operation but which may be opened if it is desired that the punch or any drill should not function during the automatic cycle.

Also associated with the punch and four drills respectively are an equal number of manual control switches PB10, PB14, PB16, PB18 and PB20.

A momentary break push button PB11 in series with PB1—stop and PB2 is associated with the first drilling station. Likewise a control PB12 with the momentary make push button "auto" and the momentary break push button "manual" is associated with the first drilling station for changing over from manual to automatic operation or the reverse.

The unloading station is provided with a further control PB21 in series with PB1—stop, PB2 and PB11 for stopping all of the apparatus in emergency.

A momentary push button PB22—go is provided at the unloading station to enable the operator there to hold up the turntable once it stops there until his work is completed and to authorize its further movement after his work is completed.

The function of the various controls, the circuits involved and various interlocks provided will most readily be understood from a consideration of the following outline of operations. The status of the controls at the beginning of operations is as represented in the wiring diagram Figure 35 with the exception that for automatic operation which is described first the switches PB9, PB13, PB15, PB17 and PB19 are closed, if it is desired to have the punch and drills function in the cycle of automatic operation.

*Operation and circuits involved*

The operator closes the double blade bus switch SB.

Operator closes the momentary make push button "start" of PB1.

Coil R1—C of main line relay R1 energized and its blade R1—B pulled up,—circuit, Positive or line bus, PB1—start, R1—C, PB1—stop, PB2, PB11, PB21, negative or ground bus.

Relay R1 held up—lock circuit, Pos. bus, R1—B, R1—C, PB1—stop, PB2, PB11, PB21, neg. bus.

Water pump motor (not shown) started but a by-pass valve prevents building up of excessive pressure.

Manual line bus LM is energized, the blade R2—B of change-over pilot relay R2 being down. Also connects ground (grd) to negative bus.

Manual pilot light PM is lighted.

Time relay RT pulled up,—circuit, Pos. bus, R2—B, LM, contact M2 (of change-over master relay R4), M1, A3, S6, S9, RT—C, grd. When time relay is fully up it initiates certain operations as noted below.

*Automatic operation*

Operator closes the momentary make "auto" button of PB12.

Change-over pilot relay R2 is pulled up,—circuit Pos. Bus. R1—B, R2—C, PB12—A, PB12—M, R1—B, grd.

Manual line bus LM is de-energized and automatic line bus LA is energized.

Manual pilot light PM extinguished and automatic pilot light PA is lighted.

Multi-point contact manual-automatic change-over master relay R4 pulled up from manual to automatic side—circuit, LA, R4—C, grd.

Time relay RT is momentarily de-energized but immediately re-energized—circuit LA, A4, A3, S6, S9, RT—C, grd.

Relay R7 at the follower position is pulled up—circuit LA, A4, A3, RT—B, S13, A1, A2, R8—B, R7—C, S2, grd.

Relay R7 forms its own lock circuit and is held up,—circuit, LA, R7—B, R7—C, S2, grd.

Relay R8 is pulled up,—circuit, LA, R7—B, R8—C, grd.

Relay R8 is held up—lock circuit, LA, R4—B, A4, A3, RT—B, S13, R4—B, A1, A2, R8—C, grd.

Relay R6 is pulled up,—circuit LA, R7—B, R6—C, R3—B, grd.

Solenoid controlled valve V1 is energized to apply variable pressure to placement and follower cylinders,—circuit, LA, R6B, A6, A5, V1—C, grd.

The placement piston 91 advances carrying with it the locating slide 80 which comes against the outer end of a carriage 70 to close switch S1.

The follower piston 206 advances carrying with it the follower slide 200 allowing S4 to open and bringing S5 against the inner end of the carriage to close it.

At this stage the operator places a billet on the carriage against the end and side gages.

Operator presses PB3—go.

Relay R3 pulled up,—circuit, LA, PB3—go, S5, S1, R3—C, S2, grd.

R3 forms its own lock circuit,—LA, R3—B, R3—C, S2, grd.

Raising of R3 breaks energizing circuit of R6 which drops, in turn de-energizing V1.

De-energization of V1 takes variable pressure off placement and follower pistons.

Follower piston retracts under constant pressure carrying with it the follower slide to open S5 and close S4 at the end of its stroke.

Solenoid controlled pilot valve V2 energized to apply variable pressure to retracting cylinder,—circuit, LA, R3—B, A7, A8, V2—C, grd.

Retracting cylinder 100 moves back (the retracting piston being held against the step drum) carrying with it the locating slide, allowing switches S1 and S3 to open at start of its movement and positively opening S2 at the end of its movement.

Closure of switch S4 and opening of switch S2 indicate that follower and locating slides have retracted out of the path of the billet carriages and unless these switches have been properly operated the turntable cannot move.

Opening of S2 breaks lock circuit of R3 and R3—B drops.

Opening of S2 also de-energizes R7 and R7—B drops.

Dropping of R3—B de-energizes V2.

Retracting motor piston 106 returned into its cylinder by its spring, leaving step drum free to rotate and closing switches S2, S3.

Simultaneously with the operations of the carriage setting apparatus, the punch and drills are operating subsequent to the full raising of the time relay RT if certain manually operated switches have been closed. These switches remain either closed or open when operated. They may be of the wall switch type operated by levers or push buttons so are referred to herein as push buttons. They include PB9 for the punch, and PB13, PB15, PB17, PB19 for the four drills respectively. For automatic operation they will now be assumed to be closed.

Raising of the time relay blade RT—B energizes the solenoid of the pilot valve V6 at the punch,—circuit, LA, A4, A3, RT—B, A21, A22, PB9, S19, S18, R15—B, R14—B, A31, A32, V6—C, grd.

Raising of time relay blade RT—B also procures raising of blade of relay R16 at punch,—circuit, LA, A4, A3, RT—B, A21, A22, PB9, S19, S18, R15—B, R14—B, R16—C, grd.

Raising of time relay blade RT—B also energizes the solenoid of the pilot valve V7 at drill #1,—circuit LA, A4, A3, RT—B, A21, A22, PB13, S—22, R17—B, A29, A30, V7—C, grd.

Raising of time relay blade RT—B also procures raising of blade of relay R18 at drill #1,—circuit, LA, A4, A3, RT—B, A21, A22, PB13, S22, R17—B, R18—C, grd.

Raising of time relay also energizes the solenoid of the pilot valve V8 at drill #2,—circuit, LA, A4, A3, RT—B, 21, A22, PB15, S25, R19—B, A27, A28, V8—C grd.

Raising of time relay also procures raising of blade of relay R20 at drill #2, circuit, LA, A4, A3, RT—B, A21, A22, PB15, S25, R19—B, R20—C, grd.

Raising of time relay also energizes the solenoid of the pilot valve V9 at drill #3,—circuit, LA, A4, A3, RT—B, A21, A22, PB17, S28, R21—B, A25, A26, V9—C, grd.

Raising of time relay also procures raising of blade of relay R22, at drill #3,—circuit, LA, A4, A3, RT—B, A21, A22, PB17, S28, R21—B, R22—C, grd.

Raising of time relay also energizes the solenoid of the pilot valve V10 at drill #4,—circuit, LA, A4, A3, RT—B, A21, A22, PB19, S31, R23—B, A23, A24, V10—C, grd.

Raising of time relay also procures the raising of blade of relay R24, at drill #4,—circuit, LA, A4, A3, RT—B, A21, A22, PB19, S31, R23—B, R24—C, grd.

Due to energization of V6 the pistons of the punch advance, opening switches S14, S15.

Building up of pressure on ram closes switch S16 adapted to secure return of the punch pistons.

Due to energization of the valves V7, V8, V9, V10 the pistons of the drills #1, #2, #3, #4 respectively advance, opening switches S20, S23, S26, S29 respectively and at the end of their strokes closing switches S21, S24, S27, S30 respectively, adapted to secure return of the drill pistons.

Closure of S16 secures return of punch pistons under constant pressure by energizing the coil and raising the blade of R14 to de-energize V6,—circuit, LA, A4, A3, RT—B, A21, A22, PB9, S19, S18, R15—B, S16, R14—C, grd.

R14 forms its own lock circuit,—circuit same as above up to R15—B, thence R14—B, R14—C, grd.

Raising of blade of R14 de-energizes R16 which drops.

Pistons of punch retract, closing switches S14, S15 and permitting S16 to open by reduction of pressure on pistons.

Closure of S21 secures return of piston of drill #1 under constant pressure by energizing the coil and raising the blade of R17 to de-energize V17,—circuit, LA, A4, A3, RT—B, A21, A22, PB13, S22, S21, R17—C, grd.

R17 forms its own lock circuit,—circuit same as above up to S22, thence R17—B, R17—C, grd.

Raising of blade of R17 de-energizes R18 which drops.

Drill #1 retracts, opening S21 and at end of return stroke closing S20.

Closure of S24 secures return of drill #2 under constant pressure by energizing the coil and raising the blade of R19 to de-energize V8,—circuit, LA, A4, A3, RT—B, A21, A22, PB15, S25, S24, R19—C, grd.

R19 forms its own lock circuit,—circuit same as above up to S25, thence R19—B, R19—C, grd.

Raising of blade of R19 de-energizes R20 which drops.

Drill #2 retracts, opening S24 and at the end of return stroke closing S23.

Closure of S27 secures return of drill #3 under constant pressure by energizing the coil and raising the blade of R21 to de-energize V9,—circuit, LA, A4, A3, RT—B, A21, A22, PB17, S28, S27, R21—C, grd.

R21 forms its own lock circuit,—circuit same as above up to S28, thence R21—B, R21—C, grd.

Raising of blade of R21 de-energizes R22 which drops.

Drill #3 retracts, opening S27 and at end of return stroke closing S26.

Closure of S30 secures return of drill #4 under constant pressure by energizing the coil and raising the blade of R23 to de-energize V10,—circuit, LA, A4, A3, RT—B, A21, A22, PB19, S31, S30, R23—C, grd.

R23 forms its own lock circuit,—circuit same as above up to S31, thence R23—B, R23—C, grd.

Raising of blade of R23 de-energizes R24 which drops.

Drill #4 retracts, opening S30 and at end of return stroke closing S29.

The operator at the unloading station removes a billet and presses the momentary make switch PB22—go.

Relay R25 is energized and raised due to closure of PB22—go,—circuit, LA, A13, A14, PB22—go, R25—C, R12—B, grd.

R25 forms its own lock circuit and is held up,—circuit, LA, A13, A14, R25—C, R12—B, grd.

Relay R11 pulled up,—circuit LA, A—13, A—14, R25—B, R11—C, grd.

Relay R11 forms its own lock circuit, and is held up,—circuit, LA, A4, A3, R11—B, R11—C, grd. When once pulled up R11 is held up until voltage fails or operation is changed over to manual.

Return of the punch and drills closing switches S14, S15, S20, S23, S26, S29, and dropping of relays R16, R18, R20, R22, R24, completes circuit for energizing valve V3 for turntable turning cylinder.

Valve V3 energized to apply variable pressure to turntable turning cylinder 300 to advance piston 301 to engage pawl behind a new notch,—circuit, LA, A15, A16, R10—B, R11—B, A17, A18, V3—C, S14, S15, R16—B, S20, R18—B, S23, R20—B, S26, R22—B, S29, R24—B, grd.

Turntable turning piston advances to engage pawl behind new notch.

Advance of turntable turning piston opens switches S6 and S7 and closes S8.

Opening of switch S6 breaks energizing circuit of time relay RT which drops.

Dropping of time relay breaks energizing circuit of relay R8 which drops.

Dropping of time relay breaks lock circuit of relays R14, R17, R19, R21, R23, which drop.

Closing of switch S8 completes interlock circuit for relay R9 which is pulled up,—circuit LA, A13, A14, R25—B, S3, S4, R7—B, S8, R9—C, grd. This interlock circuit prevents movement of turntable until loader, unloader, punch and drills have all completed their operations.

Raising of R9 energizes relay R10 to raise it,—circuit LA, A15, A16, R9—B, R10—C, S14, S15, R16—B, S20, R18—B, S23, R20—B, S26, R22—B, S29, R24—B, grd.

R10 forms its own lock circuit and is held up,—circuit, LA, A15, A16, R10—C, S14, S15, R16—B, S20, R18—B, S23, R20—B, S26, R22—B, S29, R24—B, grd.

Raising of relay R10 de-energizes valve V3 permitting turntable-turning piston to retract under constant pressure carrying with it the turntable.

Raising of relay R10 energizes the valve V4 of the stop-cylinder 340 to advance the piston 341 under variable pressure removing dog from notched disc of turntable,—circuit LA, A15, A16, R10—B, R12—B, A19, A20, V4—C, grd.

Stop piston advances, opening S9.

Turntable-turning piston retracts under constant pressure opening S8 at the start of its stroke and closing switch S7 three inches from the end of its stroke.

Opening of switch de-energizes R9 which drops.

Closing of switch S7 raises relay R12 which deenergizes valve V4 of the stop cylinder,—circuit LA, A15, A16, R10—B, S7, R12—C, grd.

R12 forms its own lock circuit and it is held up—, circuit LA, A15, A16, R10—B, R12—C, grd.

Stop piston retracted under C. P. to bring dog into position to engage notch of turntable disc.

Raising of relay R12 de-energizes R25 which drops.

Turntable-turning piston complete retracting stroke closing switch S6.

Turntable stop piston which is more powerful than the turning piston stops turntable in exact position and at the same time closes switch S9.

Closing of switches S6 and S9 energizes time relay RT which is pulled up,—circuit LA, A4, A3, S6, S9, RT—C, grd.

Raising of time relay energizes punch and drill pilot valves V6, V7, V8, V9, V10.

Raising of time relay also causes successive raising of R7, R8 and R6 to energize valve V1, for the placement and follower cylinders as described above at the beginning of the cycle.

Raising of time relay also pulls up relays R16, R18, R20, R22, R24.

Raising of any of these relays will cause relay R10 to drop.

Dropping of R10 causes R12 to drop.

AUTOMATIC OPERATION—Continued

*Row shifting*

At the end of one revolution of the turntable, i. e., when carriage #14 has passed the setting station and carriage #1 has just arrived at that station, the gage drum is turned one notch to change the position at which the locating slide will be stopped, this position determining the position at which the carriages are set and the horizontal row or line on which the billets will be drilled.

This is effected as follows:

As carriage #1 is moved into setting position, came C12 and C13 located on the turntable open switch S13 and close switch S12 associated with the gage drum turning motor.

Opening of S13 opens the energizing circuit of R7 which is involved for causing operation of the locating slide and follower slide operating mechanisms so the operation of these mechanisms is temporarily prevented. The punch and drills, however, are not affected and, the turntable being securely held in position by the turning and stop pistons, proceed through their normal cycles.

The closing of S12, on the other hand, bridges the gap in a circuit adapted to secure the energization of V5—C to raise valve V5 and operate the drum ratchet motor,—energizing circuit for V5—C is LA, A4, A3, RT—B, S12, A9, A10, R13—B, A11, A12, V5—C, grd.

The drum piston advances to engage the ratchet behind a new notch, at the same time opening S10 and closing S11.

Closure of S11 secures return of drum piston under constant pressure by energizing the coil and raising the blade of R13 to de-energize V5,—circuit, LA, A4, A3, RT—B, S12, A9, A10, S11, R13—C, grd.

Relay R13 forms its own lock circuit and is held up,—circuit, LA, A4, A3, RT—B, S12, A9, A10, R13—B, R13—C, grd.

Drum piston retracts under C. P. to turn pawl, ratchet and drum, at the same time opening S11 and closing S10.

Closure of S10 (R13 being up) energizes relay R7 just as if switch S13 had not been opened and normal operations are re-established,—circuit for R7 is LA, A4, A3, RT—B, S12, A9, A10, S10, R13—B, A1, A2, R8—B, R7—C, S2, grd.

As soon as the turntable moves again switch S13 is closed and S12 is opened.

AUTOMATIC OPERATION—Continued
*Punch cut out for end row of holes*

Owing to the fact that the end row of holes (row A) comes above the beveled end of the billets it is preferable to cut out the punch for this row to avoid the possibility of breaking off the metal by the upper punch or of shifting the billet position by the action of the lower punch on the sloping surface.

This is accomplished as follows:

Each of the carriages has a cam C17 tapered on its inner face so as to close a switch S17 for the punch when the carriages are in their innermost positions. The switch may be mounted on a fixed support and preferably is mounted near the punch for the purpose of ready identification therewith. The cams C17 for carriages #1 and #14 may be omitted, other means to be described presently acting in their stead.

Closure of S17 energizes the coil R15—C2 of relay R15 and shifts the relay blade away from its contacts,—circuit, LA, S17, R15—C2, grd.

As detailed above the energization of the valve V6 for the punch depends on the blade of R15 being against its contacts,—circuit goes from R15—B to R14—B, A31, A32, V6—C, grd.,—so when R15 is moved down V6 will not be energized and punch will skip its operation.

AUTOMATIC OPERATION—Continued
*Punch cut out for edge rows*

It is desirable to cut out the operation of the punch for the longitudinal edge rows of holes (rows a and n) for the same reason as detailed above for the end row.

This is accomplished as follows:

The turntable at the carriage positions #1 and #14 for the two edge rows are provided with cams C18 which at each turn of the turntable as the carriages #1 and #14 pass the punch open a switch S18 which is in series circuit with the blade of R15 and cuts out the punch in the same manner as R15 does.

AUTOMATIC OPERATION—Continued
*Punch and drills cut out for 12 row templets*

When operating the machine according to a twelve-row templet instead of a fourteen row templet carriages #7 and #8 are left vacant so there is no necessity for operating the punch and drills when they pass. The punch and drills are cut out as follows:

The turntable at the #7 and #8 positions is provided with cams C19 which are adapted to open the switches S19, S22, S25, S28, S31 for the punch and four drills respectively. The cams C19 are adjustable and may be set to operate the switches either by lack of billets on the carriages or by manually controlled means.

S19 for the punch is in series circuit with S18 and R15—B and cuts out the punch in similar manner. The effect of opening switches S22, S25, S28, S31 is obvious from the wiring diagram, Figure 35.

Manual operation

The preliminary steps of putting the apparatus into condition for operation are the same for either manual or automatic operation so the steps now to be described will be understood to commence with the parts in the status represented above just prior to the time the operator closed the "auto" button PB12.

The operator closes switch PB4.

This directly energizes V1 and fluid is supplied to the placement and follower cylinders to move the locating and follower slides against a carriage. Circuit for V1 is LM, M2, M1, A3, RT—B, A21, M4, M3, PB4, V1—C, grd.

Locating slide advances.
Follower slide advances.
The operator loads a billet.
The operator clamps the billet on the carriage by operating hand valve 260.
The operator opens PB4.
This de-energizes V1 and the follower slide is withdrawn under constant pressure.
The operator closes PB5.
This directly energizes V2 and fluid is supplied to the retracting cylinder to move the locating slide back clear of the carriage and billet. Circuit for V2 is LM, M2, M1, A3, RT—B, A21, M4, PB5, M6, M5, A8, V2—C, grd.

The operator opens PB5.

This de-energizes V2 and the retracting plunger is withdrawn from the step drum into the retracting cylinder by the coil spring.

The operator closes PB10 for the punch. (This sequence is not necessarily adhered to since the punch may be actuated at any time after the turntable comes to a stop.)

This energizes V6 and the punch pistons advance. Circuit for V6 is LM, M2, M1, A3, RT—B, A21, M18, M26, M25, PB10, V6—C, grd.

When the pressure on the punch pistons reaches the desired limit the operator opens PB10.

This de-energizes V6 and the punch pistons withdraw under constant pressure.

The operator closes PB14 for drill #1.

This energizes V7 and the feed piston of drill #1 advances. Circuit for V7 is LM, M2, M1, A3, RT—B, A21, M18, M24, M23, PB14, V7—C, grd.

When the drill has completed the desired stroke the operator opens PB14.

This de-energizes V7 and the piston of drill #1 returns under constant pressure.

The operator closes PB16 for drill #2.

This energizes V8 and the feed piston of drill #2 advances. Circuit for V8 is LM, M2, M1, A3, RT—B, A21, M18, M22, M21, PB16, V8—C, grd.

When the drill has completed the desired stroke the operator opens PB16.

This de-energizes V8 and the piston of drill #2 returns under constant pressure.

The operator closes PB18 for drill #3.

This energizes V9 and the feed piston of drill #3 advances. Circuit for V9 is LM, M2, M1, A3, RT—B, A21, M18, M20, M19, PB18, V9—C, grd.

When the drill has completed the desired stroke the operator opens PB18.

This de-energizes V9 and the piston of drill #3 returns under constant pressure.

The operator closes PB20 for drill #4.

This energizes V10 and the feed piston of drill #4 advances. Circuit for V10 is LM, M2, M1, A3, RT—B, A21, M18, M17, PB20, V10—C, grd.

When the drill has completed the desired stroke the operator opens PB20.

This de-energizes V10 and the piston of drill #4 returns under constant pressure.

The operator closes PB6 for the turntable turning mechanism.

This energizes V3 and the turning piston advances to engage its pawl behind a new notch. Circuit for V3 is LM, M16, M15, PB6, V3—C, S14, S15, R16—B, S20, R18— B, S23, R20—B, S26, R22—B, S29, R24—B, grd.

Advance of turning piston opens S6 and permits RT—B to drop.

Switch S8 closed at outer end of stroke.

From the above circuit it will be seen that the turntable cannot be turned until the punch and drills have been fully returned, closure of their switches being made a prerequisite for the energization of the turning mechanism.

When the pawl has engaged a new notch the operator opens PB6 and the turning piston tends to retract under constant pressure but does not do so because it is opposed by the more powerful stop piston.

The operator unloads a billet and closes unloaders PB22—go.

This energizes R25 to raise R25—B, circuit LM, M9, M10, A14, PB22—go, R25— C, R12—B, grd.

R25 forms its own lock circuit and is held up, circuit LM, M9, M10, A14, R25—C, R12—B, grd.

This completes an interlock circuit including S3 of the locating slide, S4 of the follower slide, S8 of the turning mechanism and R25—B at the unloaders station, insuring the proper status of these parts before the turntable can be turned.

Raising of R25—B procures raising of R11, circuit, LM, M9, M10, A14, R25—B, R11—C, grd.

When once energized R11 is held up until voltage fails or operation is changed over to automatic, circuit, LM, M2, M1, A3, R11— C, grd.

Raising of R11—B procures the raising of R9, circuit, LM, M9, M10, A14, R25—B, S3, S4, R7—B, S8, R9—C, grd.

Raising of R9—B procures the raising of R10, circuit, ML, M14, M13, A16, R9—B, R10—C, S14, S15, R16—B, S20, R18—B, S23, R20—B, S26, R22—B, S29, R24—B, grd.

R10 forms its own lock circuit which is the same as above except that R10—B is substituted for R9—B.

The operator closes PB7 for the turntable retracting mechanism.

This energizes V4 and the stop piston advances to remove the dog from its notch. Circuit for V4 is, LM, M14, M13, A16, R10— B, M11, M12, PB7, V4—C, grd.

Removal of stop dog from its notch removes opposition and the turning piston retracts under constant pressure to turn the turntable.

On the return stroke the turning piston first closes S7.

This energizes R12, circuit, LM, M14, M13, A16, R10—B, S7, R12—C, grd.

R12 is held up, circuit, LM, M14, M13 A16, R10—B, R12—C, grd.

Raising of relay R12 de-energizes R25 which drops.

The turning piston completes its retracting stroke.

The operator opens PB7.

This de-energizes V4 and the stop piston retracts under constant pressure to move the dog against a new notch and stop the turntable in proper position.

Return of turning and stop pistons closes S6 and S9 to energize RT—C and raise RT—B, circuit LM, M2, M1, A3, S6, S9, RT—C, grd.

MANUAL OPERATION—Continued

Row shifting

Once each revolution the step drum must be rotated one notch to change the horizontal row on which the billets are drilled.

This is preferably done at the end of the normal manual cycle described above after the turning and stop mechanisms have turned the table and stopped carriage #1 at the loading station.

At this time the operator closes PB8.

This energizes the pilot valve V5 of the drum turning mechanism to supply fluid to the ratchet cylinder. Circuit for V5 is LM, M2, M1, A3, RT—B, A21, M4, PB8, M8, M7, A12, V5—C, grd.

The ratchet piston advances to engage the ratchet behind a new notch.

The operator opens PB8 and V5 is de-energized permitting the ratchet piston to return under constant pressure carrying the drum shaft around one step.

This completes the manual cycle.

In the above description the mechanisms and controls as well as a method of operation have been described specifically and in detail in order to furnish a clear understanding of one embodiment of the invention. It is to be understood, however, that various departures from the specific embodiment may be made within the spirit of the invention. It is also to be understood that the control system has many advantages of which specific mention has been omitted for the sake of brevity. These advantages may, however, be discerned by a careful consideration of the entire specification by those skilled in the art, and are deemed sufficient basis for claims explicitly setting forth these advantages.

What I claim is:

1. Sampling apparatus of the character described comprising, a sampling device, a movable billet carriage and means to set said carriage in position to bring the billet into a predetermined relationship with said device, said means including convergent locating and follower devices acting cooperatively on said carriage under the influence of power applied approximately simultaneously to both and retracting under the influence of power separately applied, and means for halting said carriage at a predetermined point between the limits of movement of said carriage setting devices.

2. Sampling apparatus of the character described comprising, a sampling device, a turntable, a radially movable billet carriage mounted thereon and setting means for said carriage to bring the billet into a predetermined relationship with said device, said means including opposed power actuated setting devices of unequal power, and stop means for limiting the movement of the more powerful of said setting devices, said stop mechanism including means for varying the point of stoppage.

3. Sampling apparatus of the character described comprising, a sampling device, a turntable, a radially movable billet carriage mounted thereon and setting means for said carriage to bring the billet into a predetermined relationship with said device, said means including opposed power actuated setting devices of unequal power, and stop means for limiting the movement of the more powerful of said setting devices.

4. Sampling apparatus of the character described comprising, a plurality of billet carriages movable in an endless path past a setting position, said carriages also being movable transversely of said path, means at said setting station for setting said carriages in a given position transversely of said path, means including a drill for operating on the billets at a drilling station, and means for clamping said billets and carriages after setting and keeping them clamped against transverse movement until they pass said drilling station.

5. Sampling apparatus of the character described comprising a sampling device, a turntable, radially movable billet carriages mounted thereon, and means for setting said carriages to bring the billet into a predetermined relationship with said device, said means including a fluid-actuated locating means, resilient means opposing said locating device, a stop for limiting the movement of said device.

6. Sampling apparatus for taking samples from each of a series of billets, comprising in combination, a rotatable carrier, a plurality of billet carriages mounted for radial movement thereon, and positioning means for said carriages comprising a radially acting power device, and a series of stepped stops for determining the position of radial location of the respective carriages.

7. Sampling apparatus of the character described comprising a sampling device, a turntable, a plurality of radially slidable billet carriages mounted on said turntable, means for setting said carriages on the turntable and positioning billets on said carriages to bring the billet into a predetermined relationship with said device, said means including opposed locating and follower devices acting cooperatively upon a carriage and an adjustable gauge device on said locating device for acting upon the billet on the carriage, and means for clamping the billets relative to said turntable.

8. Sampling apparatus of the character described comprising, a sampling device, a turntable, a plurality of radially slidable billet carriages mounted on said turntable, and means for setting said carriages on the turntable and positioning billets on said carriages to bring the billet into a predetermined relationship with said device, said means including opposed locating and follower devices acting cooperatively upon a carriage and an adjustable gage device on said locating device for acting upon the billet on the carriage.

9. Sampling apparatus for taking samples from each of a series of billets, comprising in combination, a movable carrier, a plurality of billet carriages supported thereon and movable transversely of the line of movement thereof, and positioning means located at one point along the line of movement of the carrier for setting the billet carriages upon the carrier.

10. Sampling apparatus of the character described comprising, a sampling device, a turntable, a plurality of radially slidable billet carriages mounted thereon, carriage setting means for setting all of said carriages successively at one given radial position at one revolution of said turntable to bring the billets into a predetermined relationship with said sampling device and thereafter setting all of said carriages at another given radial position at the following revolution of said turntable, and means for clamping said carriages in position on the turntable when set.

11. Sampling apparatus of the character described comprising, a sampling device, a turntable, a plurality of radially slidable billet carriages mounted thereon, and carriage setting means for setting all of said carriages successively at one given radial position at one revolution of said turntable to bring the billets into a predetermined relationship with said sampling device and thereafter setting all of said carriages at another given radial position at the following revolution of said turntable.

12. Sampling apparatus for taking samples from each of a series of billets comprising in combination, a movable carrier, a plurality of billet carriages supported thereon and movable transversely of the line of movement thereof, and positioning means for locating the carriages at various predetermined transverse positions according to a prearranged serial order.

13. Sampling apparatus of the character described comprising, a sampling device, a turntable, a plurality of billet carriages slidably mounted thereon, means located at a setting station for setting said carriages on the turntable to bring the billets into a predetermined relationship with said sampling device, said setting means comprising a fluid-pressure actuated locating slide and a fluid-pressure actuated follower slide acting respectively on opposite sides of said carriage, said locating slide being actuated under power greater than that for operating the follower slide, and stop mechanism for limiting the movement of said locating slide including a rotatable stepped gage drum and a fluid-pressure actuated ratchet device for rotating said drum.

14. Sampling apparatus of the character described comprising, a sampling device, a turntable, a plurality of radially slidable billet carriages mounted thereon, means located at a setting station for setting said carriages on the turntable to bring the billets into a predetermined relationship with said sampling device, said setting means comprising a power operated locating slide and a power operated follower slide acting respectively on opposite ends of said carriage, said locating slide being operated under power greater than that for operating the follower slide, and stop mechanism for limiting the movement of said locating slide including a rotatable stepped drum and power means for rotating said stepped drum.

15. Sampling apparatus of the character described comprising, a sampling device, a turntable, a plurality of radially slidable billet carriages mounted thereon, means located at a setting station for setting said carriages on the turntable to bring the billets into a predetermined relationship with said sampling device, said setting means comprising a power operated locating slide and a power operated follower slide acting respectively on opposite ends of said carriage, said locating slide being operated under power greater than that for operating the follower slide, and stop mechanism for limiting the movement of said locating slide including a rotatable stepped drum.

16. Sampling apparatus of the character described comprising, a sampling device, a turntable, a plurality of radially slidable billet carriages mounted thereon, means located at a setting station for setting said carriages on the turntable to bring the billets into a predetermined relationship with said sampling device, said setting means comprising a power operated locating slide and a power operated follower slide acting respectively on opposite ends of said carriage, said locating slide being operated under power greater than that for operating the follower slide, and stop mechanism for limiting the movement of said locating slide.

17. Slab sampling apparatus comprising, a carrier, a plurality of slab supports on said carrier, said supports being L-shaped to permit overhang of said slab for access of operating devices, some of said supports being right hand and some left hand to provide among all of them an overhang corresponding to the full width of a slab.

18. Slab sampling apparatus comprising, a carrier, a plurality of slab holders mounted on said carrier, a power operated clamp for each holder for clamping a slab thereon, and means for supplying power from a fixed part to all of said power operated clamps.

19. Slab sampling apparatus comprising, a carrier, a plurality of slidable slab holders mounted on ways on said carrier and a plurality of clamps carried by the carrier, for individually clamping a slab on said holder and said holder upon its ways.

20. Slab sampling apparatus comprising, a frame, a slab support on said frame, a fluid actuated slab clamp including a cylinder and piston, means to conduct a continuous supply of fluid to one end of said cylinder, and means including a by-pass conduit and valve for conductig a supply of fluid to the other end of the cylinder from the first said end.

21. Slab sampling apparatus comprising, a travelling frame, a slab carriage slidably mounted upon said frame, said carriage including a slab supporting section and a clamp-supporting section pivoted thereto, both of said sections being mounted on the frame to resist vertical movement, and means on said clamp-supporting section for both clamping the slab upon its supports and the carriage upon the frame.

22. Slab sampling apparatus comprising, a travelling frame, a slab carriage slidably mounted upon said frame, a slab clamp mounted upon said carriage, a fluid actuated device for operating said clamp, and a telescopic connection between said frame and said carriage for supplying fluid to said device.

23. Slab sampling apparatus comprising, a frame, a slab holder mounted on said frame, spaced supports on said holder for said slab, clamping means engaging said slab near one end, and means for performing an operation on said slab toward the other end.

24. Slab sampling apparatus comprising, a traveling frame, a slab carriage slidably mounted upon said frame, supports on said carriage for one end and one side of the slab, a slab clamp, and means positioned adjacent said frame for performing an operation on said slab in its unsupported portion.

25. Apparatus for sampling slabs of metal comprising, a rotatable frame, a plurality of carriages slidably mounted on said frame, said carriages each being adapted to support a slab, and a fluid-pressure actuated arm for each carriage for both holding a slab thereon and for holding said carriage in a fixed position on said frame.

26. Apparatus for sampling slabs of metal comprising, a rotatable frame, a carriage slidably mounted on said frame, said carriage being adapted to support a slab, and means for both holding a slab on said carriage and holding the carriage in a fixed position on said frame.

27. Apparatus of the character described comprising, a turntable, a notched rotating disc on said turntable, a pawl engageable with said disc for rotating the turntable, a fluid actuated piston for operating said pawl, said piston being subject to a constant pressure tending to rotate the turntable and a preponderous variable pressure to move the piston against the constant pressure to engage the pawl behind a notch in the disc, a dog engageable with said disc for stopping the turntable, a fluid actuated piston for operating said dog, said piston being subject to a constant pressure tending to stop the turntable and a prepondering variable pressure to move the dog clear of the notched disc, said stop piston when actuated by constant pressure being more powerful than said rotating piston when actuated by constant pressure, and a fixed stop for accurately limiting the action of said dog upon said notched disc.

28. Apparatus of the character described comprising, work holders movable in successive steps past an operating station, means for moving said holders, means acting against said moving means tending to stop the movement of said holders, one of said means being more powerful than the other said means, and a stop for limiting the movement of said more powerful means for accurate positioning of said work holders.

29. Apparatus of the character described comprising, work holders movable in successive steps past an operating station, means for moving said holders, means acting against said moving means for stopping said holders, said stopping means being more powerful than said moving means, and means for limiting the action of said stopping means for accurate positioning of said work holders.

30. Apparatus of the character described comprising, work holders movable in successive steps past an operating station, means for moving said holders, and means acting against said moving means for stopping said holders, said stopping means being more powerful than said moving means.

31. Apparatus for sampling billets comprising, a plurality of billet carriages movable successively past an operating station, means acting through a fixed distance for moving said carriages, and means for stopping said carriages accurately with a given point on a billet at said operating station, said billets being stopped with different points thereof coinciding with said operating station.

32. Apparatus for sampling slabs of metal comprising, a rotatable frame, a plurality of slab retaining means on said frame, means adjacent said frame for performing an operation on the slabs, means for turning said frame to bring said slabs to said operating means, and means for stopping the frame with the slabs accurately placed with respect to said operating means, said slabs being stopped with different points thereof coinciding with said operating means.

33. Apparatus for sampling billets comprising in combination, a turntable providing means for holding a plurality of billets thereon, means for operating on said billets along radial lines and means for setting said billets acting along the radial lines, the radial line for each billet being located at a different point across its width from the radial lines for the other billets.

34. Apparatus for sampling billets comprising in combination, a turntable providing means for holding a plurality of billets theron, means for operating on said billets at points falling along radial lines and means acting along the radial lines for setting and holding said billets at predetermined and successively varying points along the radial lines in position to be acted upon by said operating means.

35. Apparatus for sampling billets comprising in combination, a turntable, a plurality of billet carriages on said turntable each for locating its billet with a different point along its width at a given fixed point, all of the points of said several billets being disposed on radial lines, and ways for said carriages parallel to such radial lines.

36. Apparatus for sampling billets comprising in combination, a rotary billet carrier movable in equal successive steps to bring a point on a billet into coincidence with a fixed radial line, and a plurality of billet holders on said carrier spaced appropriately for stopping each successive billet with a different point thereon at said fixed radial line, said holders being movable on said carrier to move an elemental line passing through the given points of the billets along a radial line.

37. Apparatus for sampling billets comprising in combination, a billet carrier movable in equal successive steps to bring a point on a billet into coincidence with a fixed line, and a plurality of billet holders on said carrier spaced appropriately for stopping each successive billet with a different point thereon at said fixed line, said holders being movable on said carrier to move an elemental line passing through the given points of the billets parallel to said fixed line.

38. Apparatus for sampling slabs of metal comprising, a rotatable frame, radially movable carriages mounted on said frame, means for holding a slab on each carriage, a drill adjacent said frame, means for turning said frame step-by-step to bring successive slabs to said drill, each slab taking a different position at the drill from each other slab, and means for moving said carriages radially at each turn of the frame.

39. Apparatus for sampling slabs comprising, an intermittently moving carrier for the slabs, means for moving said carrier to bring successive slabs to a station point, and means for locating said slabs at said station point in successively varying position along their width according to a predetermined chart.

40. Apparatus for sampling rectangular slabs in accordance with a chart of a multi-linear series of points on the surface of said slabs comprising, a carrier movable in steps past a halting point, means on said carrier for holding a plurality of slabs in position to successively stop each slab at said halting point in successively altered position in accordance with points in one line of said chart, and means providing movement of said slab-holding means for positioning the slabs on another line of points in the chart.

41. Apparatus for sampling rectangular metal slabs in accordance with a chart of a coordinate series of positions comprising, a carrier movable in steps past a halting point, and a plurality of slab carriages on said carrier, said carriages being so located on said carrier as to present their several slabs at said halting point in positions corresponding to several positions along one of the coordinates of said chart.

42. Apparatus for sampling objects in accordance with a chart of a series of positions comprising, a carrier movable in steps past a sampling point at which it halts, and a plurality of object holders disposed on said carrier, each holder being disposed in a predetermined position with reference to uniformly spaced lines so as to locate its object in a position corresponding to one of the chart positions.

43. Sampling apparatus of the character described comprising, a movable billet carriage and means for setting said carriage in position including carriage locating mechanism, said mechanism including a reciprocatory slide, a fluide operated piston for moving said slide in one direction, a rotatable step drum, a piston rod adapted to stop against a step on said drum, a cylinder for said stop piston secured to said slide and adapted when fluid is admitted thereto to retract said slide, and means for returning said stop piston into its cylinder.

44. Sampling apparatus for taking samples from each of a series of billets, comprising in combination, a movable carrier, a plurality of billet carriages supported thereon and movable transversely to the line of movement thereof, and positioning means for locating the carriages at predetermined varying positions according to a prearranged serial order, said means including a slide operated in setting direction by a first power device, a stepped stop drum, a power operated rod movable with said slide for engaging said stop drum, a second power device for moving said rod relatively to said slide to retract the slide, and means for returning said rod to its initial position relatively to the slide after the slide has been retracted.

45. Sampling apparatus of the character described comprising, a movable billet carriage and means for moving said carriage in one direction to definite positions including a locating slide, a plunger actuated by variable pressure for moving said slide inward against said carriage, means for limiting the inward movement of said slide including a cylinder and piston device one part of which is attached to said slide and the other arranged to abut against a stop, means to expand said cylinder-and-piston device under variable fluid pressure while the stop-engaging part is against the stop and means for contracting the cylinder-and-piston device to withdraw said stop-engaging one from the stop.

46. Billet sampling apparatus comprising, a movable billet carriage, a locating slide engageable with said carriage, pressure fluid operated means for advancing said slide toward said carriage and pressure fluid means for retracting said slide clear of said carriage, and means for limiting the advance movement of said slide.

47. Billet sampling apparatus comprising, a travelling frame, a billet carriage slidably mounted thereon, a locating slide engageable with said carriage for moving it, an adjustable stop member for said slide provided with a plurality of steps, means for advancing said slide having a range of movement as great as the total rise of all the steps of said stop member, and means for retracting said slide having a range of movement as great as the rise of one of said steps.

48. Billet sampling apparatus comprising a travelling frame, a billet carriage slidably mounted thereon, a locating slide engageable with said carriage for moving it, an adjustable stop member for said slide provided with a plurality of steps, means for advancing said slide having a range of movement as great as the total rise of all the steps of said stop member, means for retracting said slide having a range of movement as great as the rise of one of said steps, and means for moving said stepped stop member to provide progressive change of the stop limit of said slide either ascending or descending.

49. Billet sampling apparatus comprising a travelling frame, a billet carriage slidably mounted thereon, a locating slide engageable with said carriage for moving it, an adjustable stop member for said slide provided with a plurality of steps, means for advancing said slide having a range of movement as great as the total rise of all the steps of said stop member, means for retracting said slide having a range of movement as great as the rise of one of said steps, said stop member comprising a rotatable drum provided with an ascending and descending series of steps, and means for rotating said drum in one direction whereby the action of one series of steps will be followed by the action of the other series.

50. Billet sampling apparatus of the character described comprising, a billet locating slide, a rotatable shaft, means associated with said shaft for removably attaching a stepped stop gage drum, a turning ratchet removably mounted on said shaft, a stop gauge drum mounted on said shaft, said drum being formed in accordance with a chart of stop positions and the ratchet placed on the shaft corresponding to the stop gage used, and means adapted to act upon said ratchet for turning said shaft and gage drum at required intervals.

51. Billet sampling apparatus comprising, an operating tool, a carrier movable to bring billets to said tool, a movable billet support on said carrier, and a normally fixed adjustable side gage for billets on the holder disposed near the line of movement corresponding to the position of said tool.

52. Billet sampling apparatus comprising an operating tool, a carrier movable to bring billets to said tool, a movable billet support on said carrier, and adjustable side and end gages for determining the position of a billet on said carrier.

53. Billet sampling apparatus comprising, a turntable, radially slidable billet carriages mounted on said turntable, a billet loading station and a billet unloading station, said carriages being clamped upon said turntable at times but being free as they travel from said unloading station to said loading station, an adjustable guard rail for directing said carriages inward as they approach said loading station, and an end gage connected to the guard rail said end gage being movable to clear said carrier, support and billet.

54. Billet sampling apparatus comprising, a turntable, radially slidable billet carriages mounted on said turntable, a billet loading station and a billet unloading station, said carriages being clamped upon said turntable at times but being free as they travel from said unloading station to said loading station, a locating slide adapted to act on said carriages at said loading station, and an adjustable guard rail for directing said carriages inward as they approach said loading station.

55. Billet sampling apparatus comprising, a turntable, radially slidable billet carriages mounted on said turntable, a billet loading station and a billet unloading station, means for clamping said carriages upon said turntable at times but freeing them as they travel from said unloading station to said loading station, and an adjustable guard rail for directing said carriages inward as they approach said loading station.

56. Billet sampling apparatus comprising, a turntable, radially slidable billet carriages on said turntable, an end gage means adjacent said turntable adapted to train said carriages inward beyond the radial position of said end gage as they approach a given station, and means to bring said end gage into positioning relationship with billets on said carriages after the latter have passed said inward-training means.

57. Billet sampling apparatus comprising, a turntable, a hydraulic pressure fluid motor for turning said turntable, a hydraulic pressure fluid motor for stopping said turntable, a plurality of radially slidable billet carriages mounted on said turntable, pneumatic pressure fluid operated motors for clamping said carriages and billets relative to said turntable, circumferentially spaced punching, drilling, and carriage setting mechanisms arranged at punching, drilling and setting stations about said turntable, pressure fluid operated motors for feeding said punching and drilling mechanisms, a locating slide at said setting station, a hydraulic pressure fluid operated placement motor for advancing said slide, a pneumatic pressure fluid operated retracting motor for retracting said slide, a rotatable step gage drum cooperating with said retracting motor for limiting the advance movement of said slide and for acting as an abutment for retracting said slide, a pneumatic pressure fluid operated ratchet motor for turning said gage drum at intervals, a follower slide cooperating with said locating slide at the setting station, a hydraulic pressure fluid operated motor for actuating said follower slide, means for supplying fluid under constant pressure for operating said turntable turning and stop motors to turn and stop the turntable, means for supplying fluid under variable pressure to said turning and stop motors to operate them in the opposite direction, solenoid operated valves for controlling variable pressure supplied to said turning and stop motors, means for supplying fluid under constant pressure for operating said billet clamping motors to clamp the billets, means for supplying fluid under variable pressure to said clamping motors to release the billets, hand valves for controlling variable pressure supplied to said clamping motors, means for supplying fluid under constant pressure to said punch and drill feeding motors to retract the punch and drills from the billets, means for supplying fluid under variable pressure to said punch and drill feeding motors to advance the punch and drills toward the billets, solenoid operated valves for controlling variable pressure supplied to said punch and drill feeding motors, means for supplying fluid under constant pressure to said follower motor for retracting the follower slide from a carriage, means for supplying fluid under variable pressure to said follower and placement motors for advancing the follower and locating slide to set a carriage, a solenoid operated valve for controlling variable pressure supplied to both said follower and placement motors, means for supplying fluid under variable pressure to said retracting motor to retract said locating slide, a solenoid operated valve for controlling variable pressure supplied to said retracting motor, a spring for moving a part of said retracting motor clear of said drum after the slide has been retracted, means for supplying fluid under constant pressure to said ratchet motor to turn said gage drum, means for supplying fluid under variable pressure to said ratchet motor to move it in the opposite direction, a solenoid valve for controlling variable pressure supplied to said ratchet motor, all of said solenoid valves being adapted to be operated directly by hand independently of the solenoid controls, means for controlling current supplied to the solenoids of said valves for individual manual operation of their associated motors, and means for securing inter-related control of current supplied to said solenoid valves for interlocked automatic operation of their associated motors.

58. Apparatus as set forth in claim 57 in which said means for automatic control includes primary switches actuated by the moving elements of said motors, relays or contactors associated with the primary switches and solenoids of the solenoid valves, and general controls for supervision of the system.

59. Billet sampling apparatus comprising, a turntable, billet carriages slidably mounted thereon, devices at a setting station for setting said carriages, devices disposed adjacent the turntable, for performing an operation upon said billets, devices for rotating said turntable in steps, and control means for securing inter-related automatic operation of all said devices.

60. Billet sampling apparatus comprising, a turntable, billet carriages slidably mounted thereon, devices at a setting station for setting said carriages, devices disposed adjacent the turntable for performing an operation upon said billets, devices for rotating said turntable in steps, and control means for securing interrelated automatic operation of all said devices, said control means preventing movement of said turntable until said setting and operation-performing devices have been returned to off position.

61. Billet sampling apparatus comprising, a turntable, billet carriages slidably mounted thereon, devices at a setting station for setting said carriages, devices disposed adjacent the turntable for performing an operation upon said billets, devices for rotating said turntable in steps, and control means for securing inter-related automatic operation of all said devices, said control means preventing movement of said setting and operation-performing devices until said turntable rotating devices have rotated and stopped the turntable.

62. Billet sampling apparatus comprising, a turntable, billet carriages slidably mounted thereon, devices at a setting station for setting said carriages, devices disposed adjacent the turntable for performing an operation upon said billets, devices for rotating said turntable in steps, and control means for securing inter-related automatic operation of all said devices, said control means including primary switches actuated by said devices and solenoid valves controlling the actuation of said devices.

63. Billet sampling apparatus comprising, a movable billet carriage, means for intermittently moving said carriage, locating and follower slides for setting said carriage primary switches operated by engagement of said slides with said carriage, and a control circuit governed by said switches for preventing the action of said carriage moving means until said slides have withdrawn.

64. Billet sampling apparatus comprising, a movable billet carriage, locating and follower slides for setting said carriage and primary switches operated by engagement of said slides with said carriage, said switches serving to indicate when the slides have moved clear of said carriages to permit other mechanism associated therewith to operate.

65. Billet sampling apparatus comprising, a turntable, turning mechanism therefor, billet holding means on said turntable, billet setting means, and devices for taking samples from said billets, said sampling devices including control means adapted to secure their withdrawal from the billets through the influence of some condition produced by themselves but preventing their advance movement until some condition has been produced by extraneous means.

66. Billet sampling apparatus comprising, a turntable, turning mechanism therefor, billet holding means on said turntable, billet setting means, and devices for taking samples from said billets, said sampling devices including control means adapted to secure their withdrawal from the billets through the influence of some condition produced by themselves but preventing their advance movement until some condition has been produced by extraneous means, said sampling devices including a fluid operated billet compacting punch and said control means therefor including a pressure limiting device adapted to secure the return of the punch upon the attainment of a predetermined pressure of the punch-operating fluid.

67. Billet sampling apparatus comprising, a turntable, turning mechanism therefor, billet holding means on said turntable, billet setting means, and devices for taking samples from said billets, said sampling devices including control means adapted to secure their withdrawal from the billets through the influence of some condition produced by themselves but preventing their advance movement until some condition has been produced by extraneous means, said sampling devices including a drill, and said control means therefor including an element adapted to secure the return of the drill after it has reached a predetermined distance limit.

68. Sampling apparatus for taking samples from each of a series of billets, comprising in combination, a sampling device acting upon said billets, means for supporting the billets consisting of a series of traveling billet carriages moving to bring the billets in succession to the sampling device, and means for automatically presenting the successive billets to the sampling device in different positions relatively thereto according to a prearranged serial order.

69. Apparatus as set forth in claim 68 in which said billet presenting means comprises means for locating the successive billets in different lateral positions relatively to the sampling device.

70. Apparatus as set forth in claim 68 in which said billet presenting means comprises means for locating successive groups of billets in different longitudinal order relatively to the sampling device.

71. Apparatus as set forth in claim 68 in which said billet supporting means comprises a movable carrier supporting the billet carriages, and means for advancing the carrier step by step to bring the successive billets to the sampling device.

72. Apparatus as set forth in claim 68 in which said billet supporting means includes a turntable, means for turning it, and means for stopping and holding it in successive positions during the sampling operation.

73. Apparatus as set forth in claim 6 in which said stepped stops are formed on a cylindrical drum having power means for turning it from step to step, and means for causing said power means to turn said drum through the distance of one step for each revolution of the turntable.

74. Sampling apparatus comprising in combination, a fluid pressure device assisting in locating billets on a turntable, a fluid pressure device for indexing the stop position of the billets, a fluid pressure device for clamping said billets, a fluid pressure device for rotating a plurality of billets on a carrier, a fluid pressure device for stopping said turntable, fluid pressure means for taking samples from said billets, means for supplying constant pressure to said fluid pressure devices to actuate them in one direction and means for supplying a greater and controllable or variable pressure to actuate the devices in the opposite direction.

75. Sampling apparatus for taking samples from billets, comprising in combination, means for removing a core of metal from the billets and means for compacting the metal in the spot where said sample is to be taken.

76. Sampling apparatus for taking samples from billets, comprising in combination, a movable carrier, a plurality of billets borne thereon, a plurality of drills acting successively to drill the same hole, and means for advancing and halting the billets in correct position at each of said drills in succession.

77. Sampling apparatus for taking samples from a plurality of billets, comprising in combination, a movable billet carrier, a drill for taking samples from billets when halted thereat, and means for preventing the movement of said carrier until said drill has been withdrawn clear of the billet.

In testimony whereof, I have signed my name to this specification this 14th day of December, 1929.

DAVID L. SUMMEY.

CERTIFICATE OF CORRECTION.

Patent No. 1,909,596. May 16, 1933.

DAVID L. SUMMEY.

It is hereby certified that error appears in the printed specification of the above numbered patent requiring correction as follows: Page 10, line 90, for "suffix C" read "suffix-C"; page 13, line 77, for "R6B" read "R6-B"; page 14, line 32, for "21" read "A21"; and line 85, for "V17" read "V7"; page 15, line 120, for "came" read "cams"; page 17, line 107, for "ML" read "LM"; page 20, line 87, claim 27, for "preponderous" read "prepondering"; page 21, line 125, claim 43, for "fluide" read "fluid"; and that the said Letters Patent should be read with these corrections therein that the same may conform to the record of the case in the Patent Office.

Signed and sealed this 22nd day of August, A. D. 1933.

M. J. Moore.

(Seal) Acting Commissioner of Patents.